(12) United States Patent
Johnson

(10) Patent No.: US 10,408,659 B2
(45) Date of Patent: Sep. 10, 2019

(54) BIN LEVEL INICATOR

(71) Applicant: Thomas C. Johnson, Roseau, MN (US)

(72) Inventor: Thomas C. Johnson, Roseau, MN (US)

(73) Assignee: LTJ ENTERPRISES, INC., Roseau, MN (US)

( * ) Notice: Subject to any disclaimer, the term of this patent is extended or adjusted under 35 U.S.C. 154(b) by 699 days.

(21) Appl. No.: 14/820,706

(22) Filed: Aug. 7, 2015

(65) Prior Publication Data

US 2016/0216147 A1    Jul. 28, 2016

Related U.S. Application Data

(60) Provisional application No. 61/999,828, filed on Aug. 7, 2014.

(51) Int. Cl.
| | | |
|---|---|---|
| *G01F 23/02* | (2006.01) | |
| *G01F 23/00* | (2006.01) | |
| *B65D 90/48* | (2006.01) | |

(52) U.S. Cl.
CPC .............. *G01F 23/02* (2013.01); *B65D 90/48* (2013.01); *G01F 23/003* (2013.01); *G01F 23/0007* (2013.01); *B65D 2590/0091* (2013.01)

(58) Field of Classification Search
CPC .... G01F 23/02; G01F 23/0007; G01F 23/003; B65D 90/48; B65D 2590/0091
USPC .......... 116/204, 227, 229, 333, 334; 33/465, 33/471, 531, 534, 613; 73/290 R
See application file for complete search history.

(56) References Cited

U.S. PATENT DOCUMENTS

| | | | |
|---|---|---|---|
| 805,102 A * | 11/1905 | Swanson ............... | B63B 35/815 116/303 |
| 910,606 A | 1/1909 | Swanson | |
| 943,868 A | 12/1909 | Garlick | |
| 2,260,661 A | 10/1941 | Enderud | |
| 2,352,080 A | 6/1944 | Crowley et al. | |
| 2,571,378 A * | 10/1951 | Parisi .................. | G01F 23/0007 137/554 |
| 2,640,977 A * | 6/1953 | Parisi .................... | G01F 23/164 116/227 |
| 2,680,298 A | 6/1954 | Obenshain | |
| 2,718,867 A * | 9/1955 | Ray ....................... | G01F 23/003 116/215 |
| 2,915,205 A * | 12/1959 | Strader ................. | B65G 47/00 414/289 |
| 2,963,201 A | 12/1960 | Westlin | |
| 3,018,343 A | 1/1962 | Grostick | |
| 3,019,310 A * | 1/1962 | Hoff .................... | G01F 23/0007 200/61.21 |
| 3,210,493 A | 10/1965 | Lau | |

(Continued)

*Primary Examiner* — Justin Seo
*Assistant Examiner* — Tania C Courson
(74) *Attorney, Agent, or Firm* — Richard John Bartz

(57) ABSTRACT

A material storage bin has an upright wall supporting a plurality of vertically spaced indicators providing a person with visual information regarding the level of the material in the bin. The indicators have contrasting visual colors as bright yellow and dark black surfaces that are selectively displayed to provide a person with information of the level of material in the bin. An actuator located in the bin cooperates with a motion transmission apparatus to move visual members to an ON position displaying the bright color when the material engages the actuator and to an OFF position when the actuator is free of material in the bin.

36 Claims, 16 Drawing Sheets

(56) References Cited

U.S. PATENT DOCUMENTS

| | | | |
|---|---|---|---|
| 3,210,495 A | 10/1965 | Lau | |
| 3,286,053 A | 11/1966 | Capra | |
| 3,290,462 A | 12/1966 | Watkins | |
| 3,348,004 A * | 10/1967 | Carroll | G01F 23/0007 200/61.2 |
| 3,443,437 A | 5/1969 | Skalka | |
| 3,575,130 A | 4/1971 | Altmann | |
| 3,685,356 A | 8/1972 | Zimmerman | |
| 3,831,159 A * | 8/1974 | Parsons | G01F 23/0007 340/617 |
| 4,170,311 A * | 10/1979 | Spaw | B65D 90/48 414/289 |
| 4,627,378 A | 12/1986 | Manness et al. | |
| 4,799,383 A | 1/1989 | Johnson et al. | |
| 4,829,820 A | 5/1989 | Johnson et al. | |
| 4,936,245 A * | 6/1990 | Christianson | G01F 23/02 116/227 |
| 5,088,323 A | 2/1992 | Johnson et al. | |
| 5,295,359 A * | 3/1994 | Reilly, Jr. | F04B 39/02 184/108 |
| 5,374,790 A | 12/1994 | Horvath | |
| 5,425,329 A | 6/1995 | Pollock | |
| 6,067,927 A | 5/2000 | Johnson et al. | |
| 7,389,688 B1 * | 6/2008 | Vander Horst | G01F 23/02 210/86 |
| 7,579,564 B2 | 8/2009 | Henderson | |
| 9,169,032 B2 * | 10/2015 | Gengerke | B65B 1/32 |
| 9,809,381 B2 * | 11/2017 | Oren | B65D 88/30 |
| 2008/0035647 A1 * | 2/2008 | Fuller | B60H 1/20 220/530 |
| 2012/0036927 A1 * | 2/2012 | Sanders | G01F 23/02 73/291 |
| 2012/0285273 A1 * | 11/2012 | Haskins | G01F 23/02 73/866 |
| 2013/0037566 A1 * | 2/2013 | Bohm | G01F 23/36 222/51 |
| 2013/0327140 A1 * | 12/2013 | Lienenkamp | G01F 23/0007 73/290 V |
| 2016/0146655 A1 * | 5/2016 | Gardiner | G01F 23/02 73/323 |
| 2019/0017859 A1 * | 1/2019 | Johnson | G01F 23/0007 |

* cited by examiner

BIN LEVEL INICATOR

CROSS REFERENCE TO RELATED APPLICATION

This application claims the priority of U.S. Application Ser. No. 61/999,828 filed Aug. 7, 2014.

FIELD OF THE INVENTION

The invention relates to technology of visual information concerning the amount of and level of material stored in a bin. The visual information is derived from one or more visual indicators having actuators responsive to the material in the bin to control visual members to display light color or dark color information to a person viewing the bin.

BACKGROUND OF THE INVENTION

Material storage structures and bins have been provided with visual indicators to provide a person with information concerning the level and amount of material located in the structures and bins. Examples of visual indicators attached to bins to provide visual information regarding the level of material stored in the bins are shown and described in the following U.S. patents.

P. Swanson in U.S. Pat. No. 910,606 discloses a coal bin having vertically spaced visual indicators along an upright wall of the bin. Each indicator has a plate pivotally supported on the inside of the upright wall and a pair of plates hinged to the outside of the upright wall. A rod extended through a hole in the upright wall is pivotally connected to the plates. Coal in the bin forces the inside plate against the upright wall and moves the outside plate to an upright position. A person standing adjacent the bin can look at the upright plate to ascertain whether it is loaded, empty or partially filled up with coal.

A. Enderud in U.S. Pat. No. 2,260,661 discloses a gauge for indicating the level of seed grain in a seed box. A shaft rotatably mounted on the seed box is connected to a scale located adjacent the outside of the seed box. An arm is joined to the inside end of the shaft. The lower end of the arm supports a rider or float. The rider moves up and down with the level of seed grain in the seed box causing the indicator of the gauge to move thereby providing a visual indication of the level of seed grain in the seed box.

J. R. Ray in U.S. Pat. No. 2,718,867 discloses a material level indicator for a bin. A bin wall has an opening covered with a mounting plate. Brackets secured to the mounting plate pivotally support a visual flag for movement between vertical and horizontal positions. An inverted V-shaped member secured to the plate extends horizontally into the chamber of the bin. An arm pivotally mounted on the member extended downwardly is attached to a paddle adapted to contact the material in the bin. A linkage connected to the arm and flag transmits pivotal movement of the arm to pivot the flag between the vertical and horizontal positions that provide visual information regarding the level of the material in the bin.

F. M. Lau in U.S. Pat. No. 3,210,493 discloses a bin level sensing device having a sensing arm pivotally mounted with a spherical bearing on a housing. A ball is attached to the outer end of the arm. A motor operates to move the arm and ball in a circular path. When ball engages material in the bin, the motor stalls and closes a microswitch thereby providing information relative to the level of material in the bin.

L. W. Watkins in U.S. Pat. No. 3,290,462 discloses a bin level switch operable to control an alarm signal or relays to shut off the feed of coal to a bin. A rigid rod connected to a coupling having a spherical head extended down into the bin engages the coal in the bin. A shield attached to the rod protects the rod from the impact of lumps of coal rolling down in the bin. An arm connected to the coupling has an upper end engageable with an actuator of an electric switch. When the level of the coal in the bin moves the rod laterally, the arm swings away from the switch actuator whereby the switch is turned on activating the alarm.

R. V. Zimmerman in U.S. Pat. No. 3,685,356 discloses a level indicator for granular material being discharged in a bin. The indicator has a feeler arm arranged to sit on the side of a conical pile of granular material in the bin. A mechanical linkage including a shaft and arms transmit motion to a useable mechanical or electrical signal used for the detection, indication and/or control of the level of the pile of granular material in the bin.

T. C. Johnson and L. W. Johnson in U.S. Pat. No. 4,799,383 disclose a visual indicator for providing a positive visual indication of the level of grain in a bin. The indicator has a sealed chamber filled with an opaque liquid. A contrasting plug secured to a diaphragm is movable in response to an actuator located in the bin between an OFF position obscured by the liquid and an ON position wherein the plug is visible upon displacement of the liquid. The actuator includes a resilient dome that collapses in response to pressure of the grain in the bin.

L. W. Johnson and T. C. Johnson in U.S. Pat. No. 4,829,820 disclose a visual indicator operable to provide positive ON and OFF visual information to a person of the level of grain in a bin. This indicator has the opaque liquid and plug disclosed in U.S. Pat. No. 4,799,383. The actuator has an arm pivoted to a housing. A pressure plate secured to the bottom of the arm is moved by the pressure of grain in the bin whereby the arm applies a force to a stem operatively connected to the plug to move the plug between an OFF position obscured by the liquid and an ON position wherein the plug is visible upon displacement of the liquid. A spring biases the plug and arm to the OFF position.

L. W. Johnson and T. C. Johnson in U.S. Pat. No. 5,088,323 disclose a visual indicator having an actuator connected to a mounting bracket. The bracket and actuator extends through a hole in the side wall of a bin. Part of the bracket and actuator is moved from the outside of the bin wall through the hole to the inside of the bin. The actuator has a lever pivotally mounted on the bracket and pressure plates connected to the lever. A bag attached to the bracket surrounds the pressure plates. The presence of grain in the bin causes the bag to collapse whereby the entire force acting on the bag is transmitted to the pressure plates to activate the visual indicator. An alternative actuator has a triangle-shaped collapsible plate connected to a force transmitting cup and a motion restriction washer. A bolt and threaded insert connects the pressure plate 290 to the washer and cup.

L. W. Johnson and T. C. Johnson in U.S. Pat. No. 6,067,927 disclose a visual indicator secured to the side wall of a material storage bin that operates to provide a person with visual information concerning the level of materials in the bin. The indicator has a body supporting rotatable visual members having contrasting colored portions covered with a transparent lens. An arm pivotally mounted on the body operates a motion transmission gear assembly that selectively rotates the visual members between ON and OFF positions. An actuator responsive to the material in the bin is operatively connected to the arm to pivot the arm to cause the motion transmission gear assembly to rotate the visual members between ON and OFF positions thereby providing visual information of the level of material in the bin.

SUMMARY OF THE INVENTION

The indicator is operable in response to the level of material in a bin to provide a person remote from the bin with information as to the level of the material in the bin. The information is displayed as visual bright or dark colors, such as yellow and black, that are viewable by the person. A number of indicators are vertically spaced on the side wall of the bin to provide the person with information as to the level of material from empty, partly full to full. The indicator is adapted to detect the level of any material ranging from powders to pellets including agricultural grains, feeds, plastic pellets, fertilizers, salt, minerals and sand. The indicator comprises an actuator, at least one visual member and a motion transmission apparatus operatively connecting the actuator with the visual member. The actuator located within the bin is moved by material in the bin from a first position to a second position adjacent the inside of the upright wall of the bin. The actuator moves the motion transmission apparatus which in turn moves the visual member to display either a bright color, such as yellow, orange or green, or a dark color, such as black or grey. The bright color display provides visual information that the level of the material in the bin is at or above the location of the indicator on the side wall of the bin. The dark color display provides visual information that the level of the material in the bin is below the location of the indicator on the side wall of the bin.

The indicator has a housing with an internal chamber closed with a light transparent member or lens. One or more visual members located in the internal chamber are movably supported on the housing for movement relative to the transparent lens to show either the bright color display or the dark color display. An actuator including a flexible body and an elongated bar are located within the bin. The bin is retained in engagement with the inside of the side wall of the bin with a boss extended through a hole in the upright wall of the bin. A fastener on the boss cooperates with the side wall of the bin to hold the bar against the side wall of the bin. The actuator has a generally flat and flexible body of sheet material with an upper portion attached to the bar. The body has a semi-conical shape that extends downwardly into the bin. A motion transmission apparatus movably mounted on the bar and boss transmits angular movement of the body to rotational movement of the visual members to show either the bright color display or dark color display. The motion transmission apparatus includes first and second rods or arms connected to a spherical ball. The ball located in a pocket between a pair of bars rotates to angularly move the rods which in turn moves the visual members. One rod engages the body of the actuator whereby movement of the body of the actuator results in movement of the motion transmission apparatus. The other rod is connected to a member having rows of arcuate teeth engageable with spur gears on the visual members. A biasing member connected to the body and motion transmission apparatus biases the motional transmission member and body of the actuator in a direction to locate the visual members to display a dark color providing visual information that the level of the material in the bin is below the position of the indicator on the side wall of the bin.

DESCRIPTION OF THE INVENTION

Figure 1:
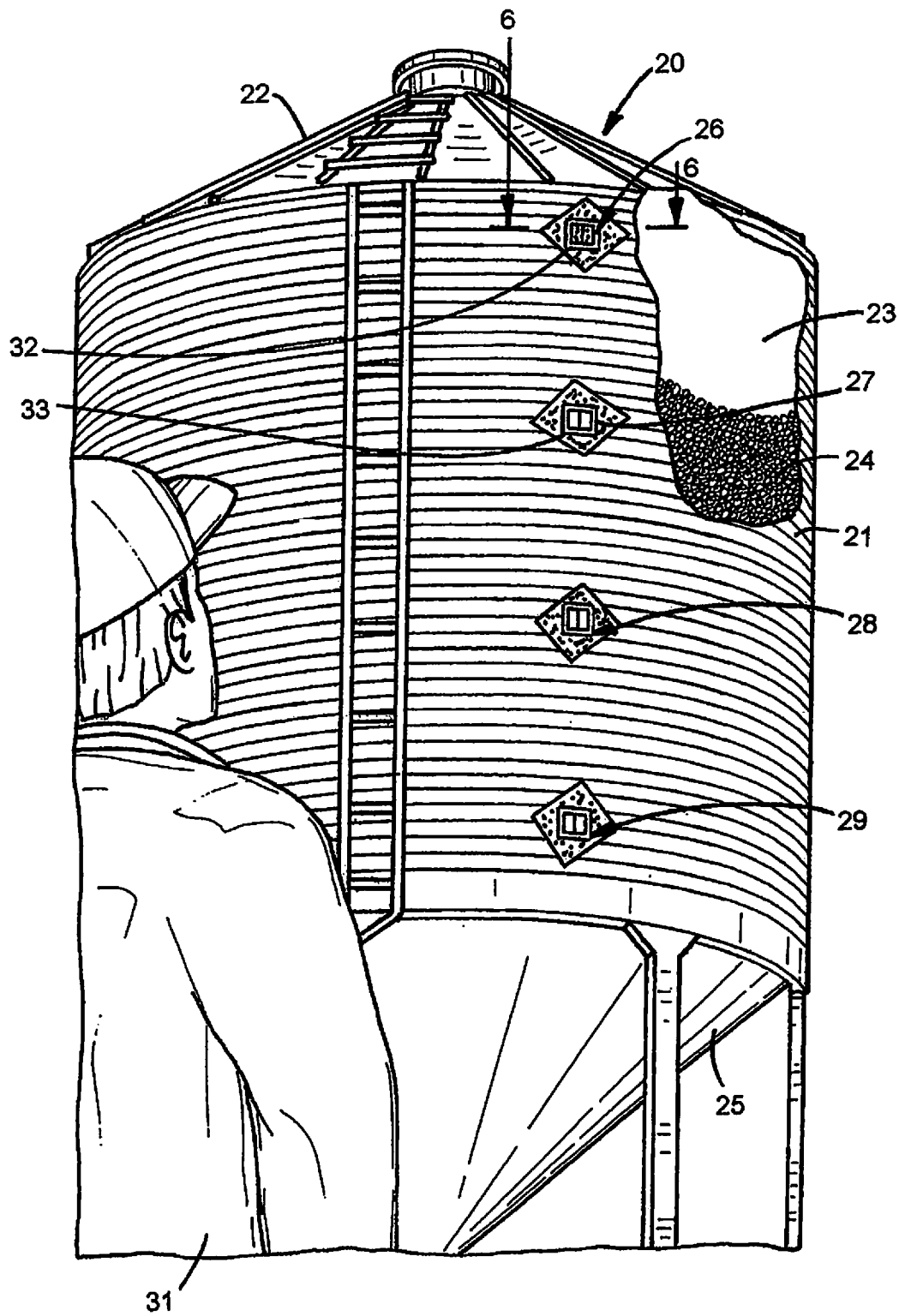
FIG. 1 is a perspective view of a material storage bin having material level indicators of the invention mounted on the side wall of the bin.

A material storage bin 20, shown in FIG. 1, is a conventional grain bin having a cylindrical upright side wall 21 supporting a roof 22. Side wall 21 surrounds an interior chamber or compartment 23 for storing materials 24. The materials include grain, animal feed, granular fertilizer, plastic pellets, minerals, cement powers and sand. These and other particulate materials are herein identified as materials. The amount of the materials 24 stored in chamber 23 can vary from a full chamber to an empty chamber. Management of the stored materials requires information as to the amount of materials in the chamber of the bin. The top surface of the materials along with the vertical height and size of the chamber determines the volume of materials in the chamber 23 of the bin 20.

Visual indicators 26, 27, 28 and 29 mounted on side wall 21 at vertically spaced positions provide a person 31 remote from the bin with visual information of the presence of materials at selected levels or vertical positions in chamber 23. Each indicator 26-29 provides positive YES or negative NO visual information of the presence of material adjacent the indicator. Indicator 26 is in its dark color negative NO position which provides negative visual information that the level of the material is below indicator 26. Indicator 27 is in its light color positive YES position which provides positive visual information that the level of the material is at or above indicator 27.

Figure 2:
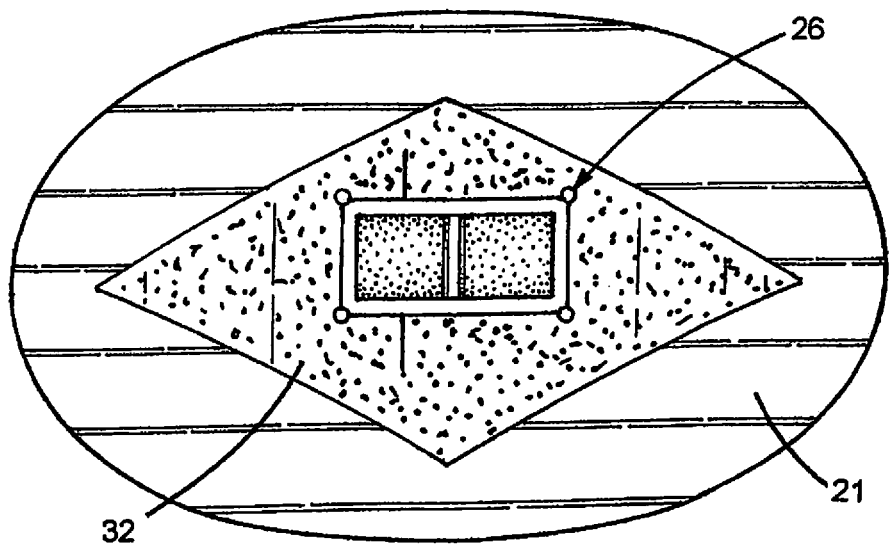
FIG. 2 is a front view of a material level indicator on the side wall of the bin showing the visual members in the dark or no material level position.
Figure 3:
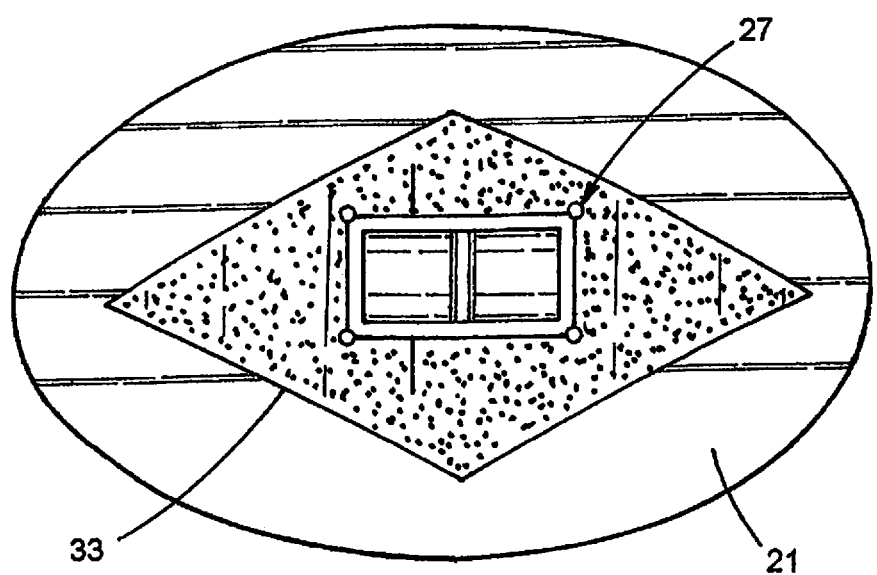
FIG. 3 is a front view of a material level indicator on the side wall of the bin showing the visual members in the light or material level position.

As shown in FIG. 2, indicator 26 is superimposed on a black color member 32. When indicator 26 is in the dark color or negative NO position, it visually blends in with the black color member 32. Member 32 has an equilateral quadrilateral shape. Other shapes including round, triangular and rectangular can be used for member 32. Member 32 is a decal attached with an adhesive to the outside of side wall 21. Indicator 27 is also superimposed on a black member 33. When indicator 27 is in the light or positive YES visual position, it provides a light color contrast with the black color member 33 which visually stands out and is readily observed by the person 31. Member 33 has the same size and shape as member 32.

Figure 4:
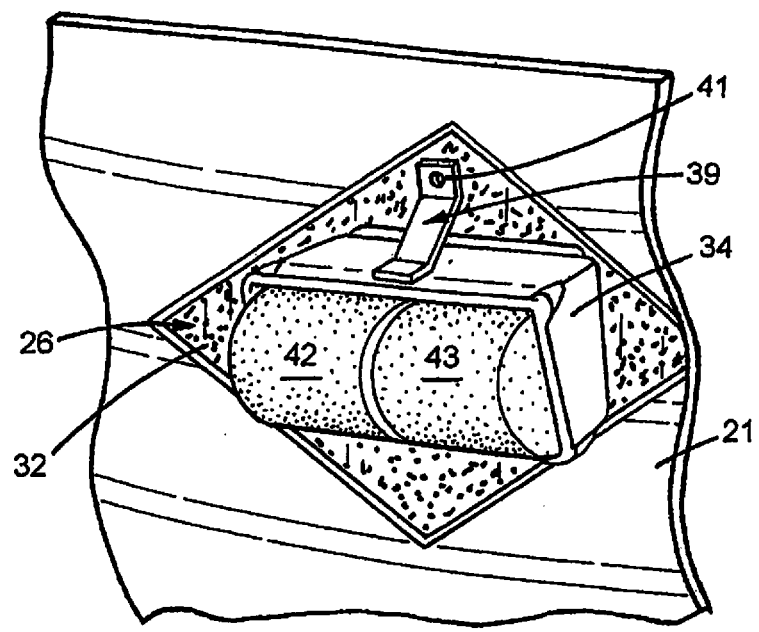
FIG. 4 is a perspective view of a material level indicator mounted on the side wall of the bin.
Figure 5:
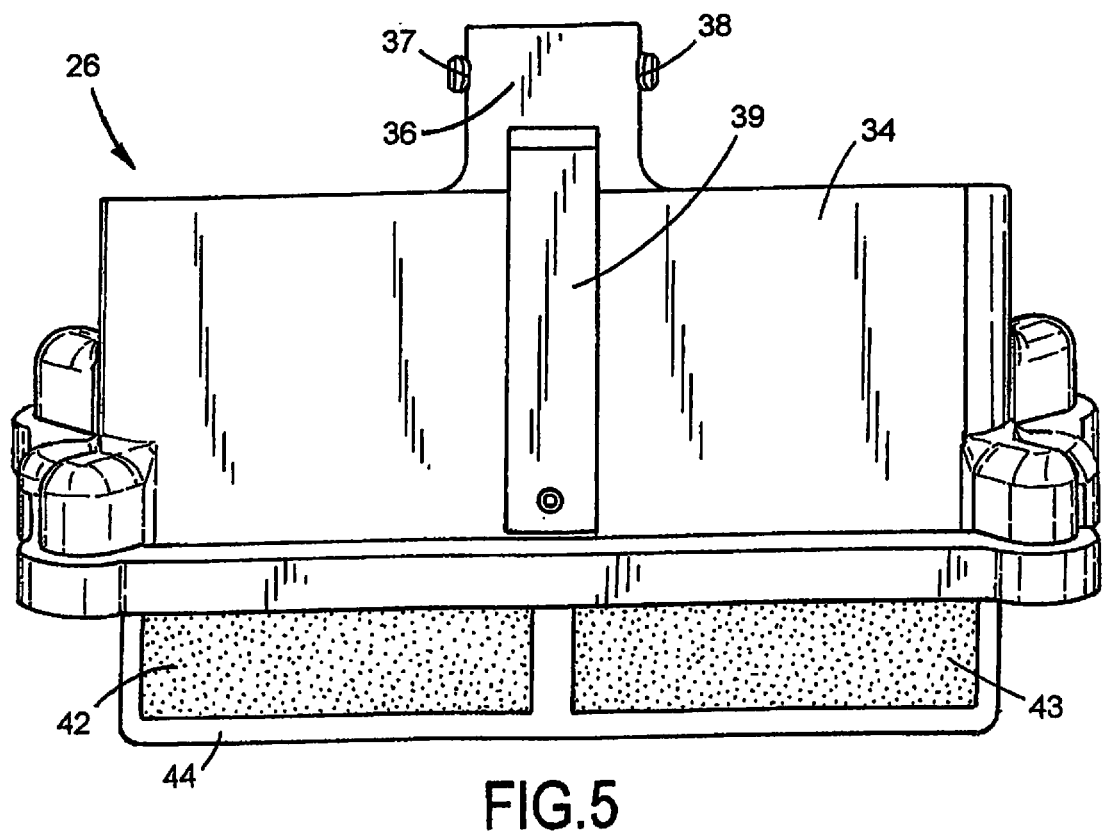
FIG. 5 is a top view of the housing and visual members of a material level indicator.
Figure 7:
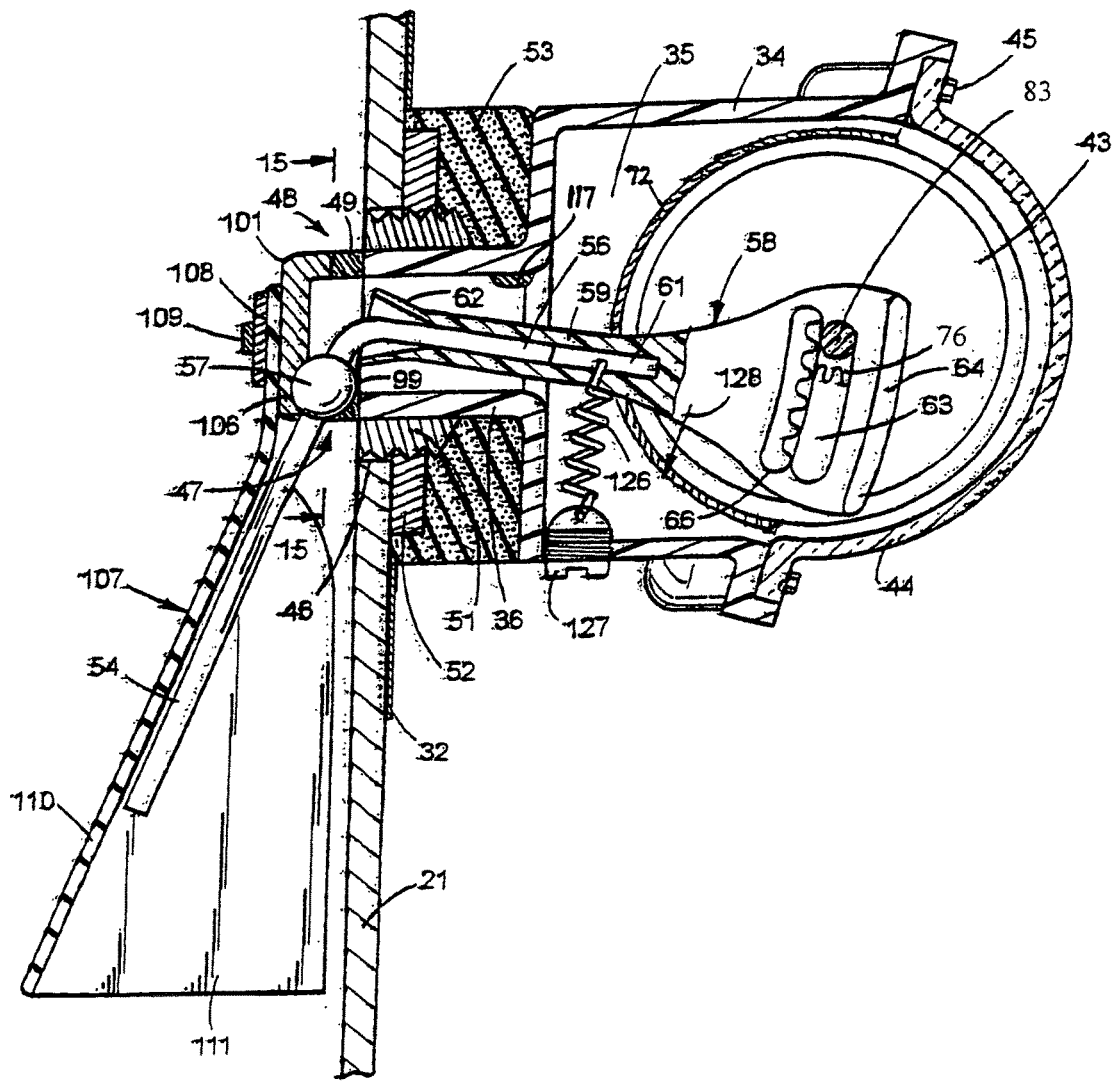
FIG. 7 is a sectional view taken along line 7-7 of FIG. 6 showing the visual indicators in the dark OFF positions.
Figure 8:
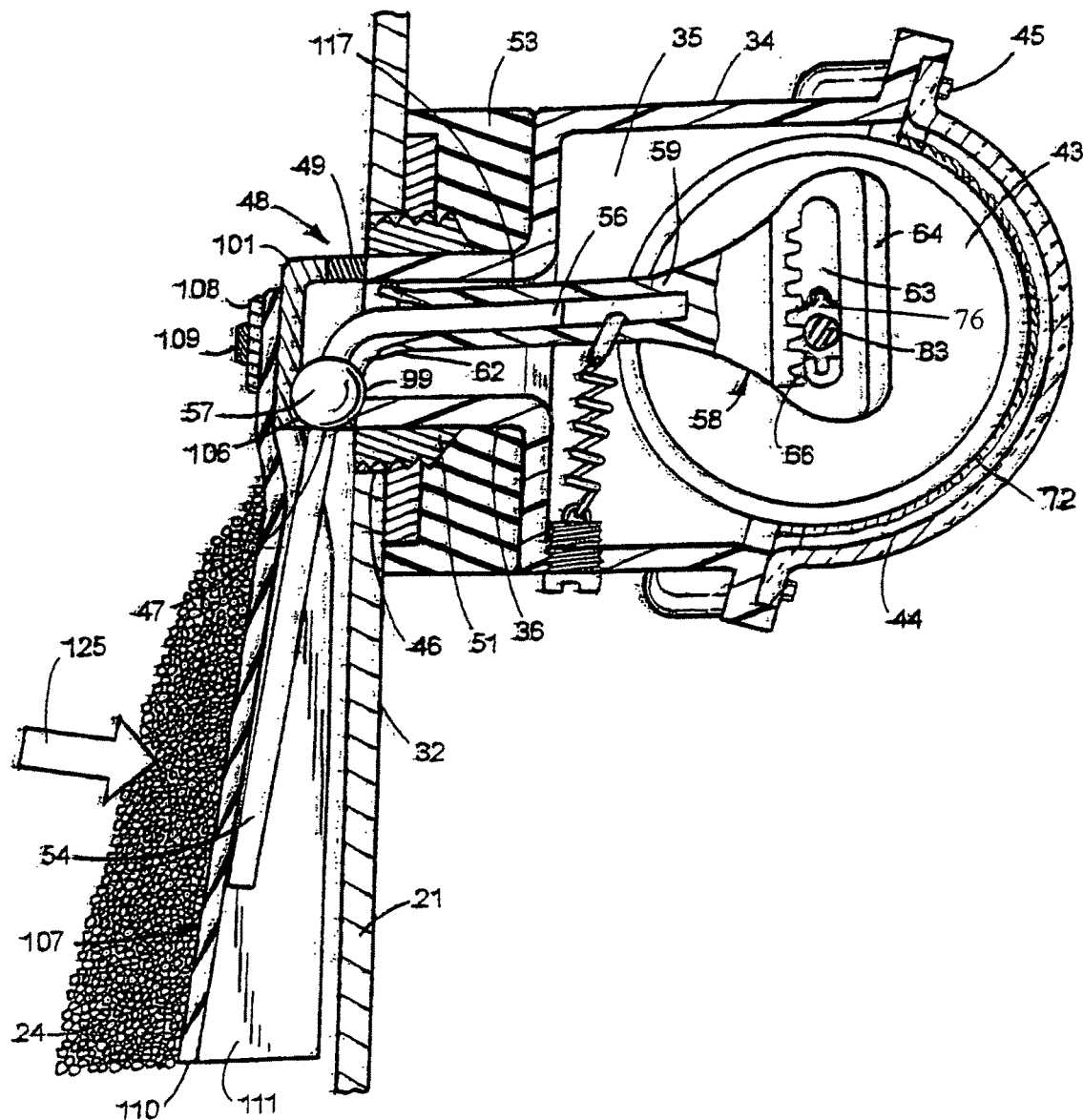
FIG. 8 is a sectional view of FIG. 7 showing the visual indicators in the light ON positions.
Figure 9:
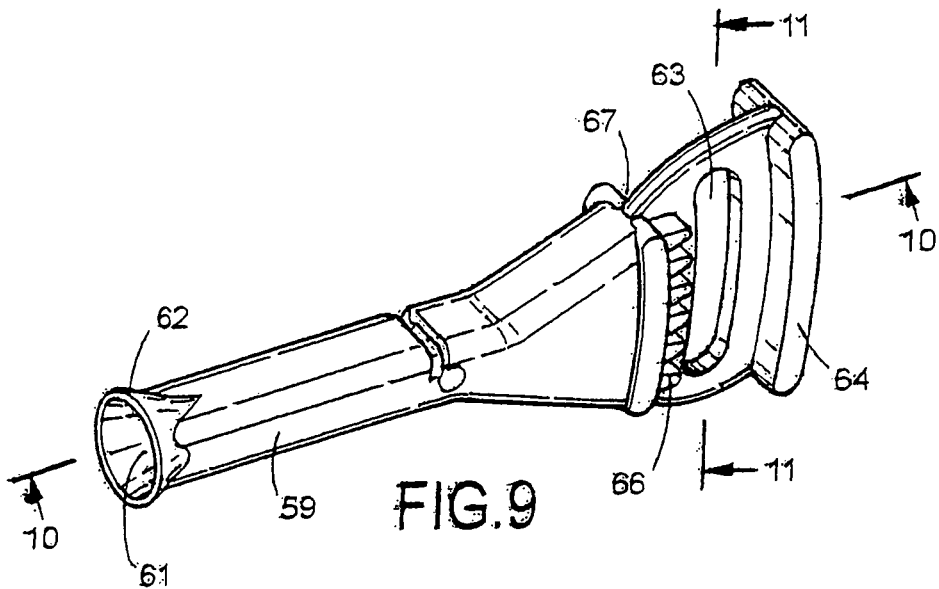
FIG. 9 is a perspective view of the motion transmission apparatus having two rows of teeth engageable with the spur gears on the visual members.
Figure 10:
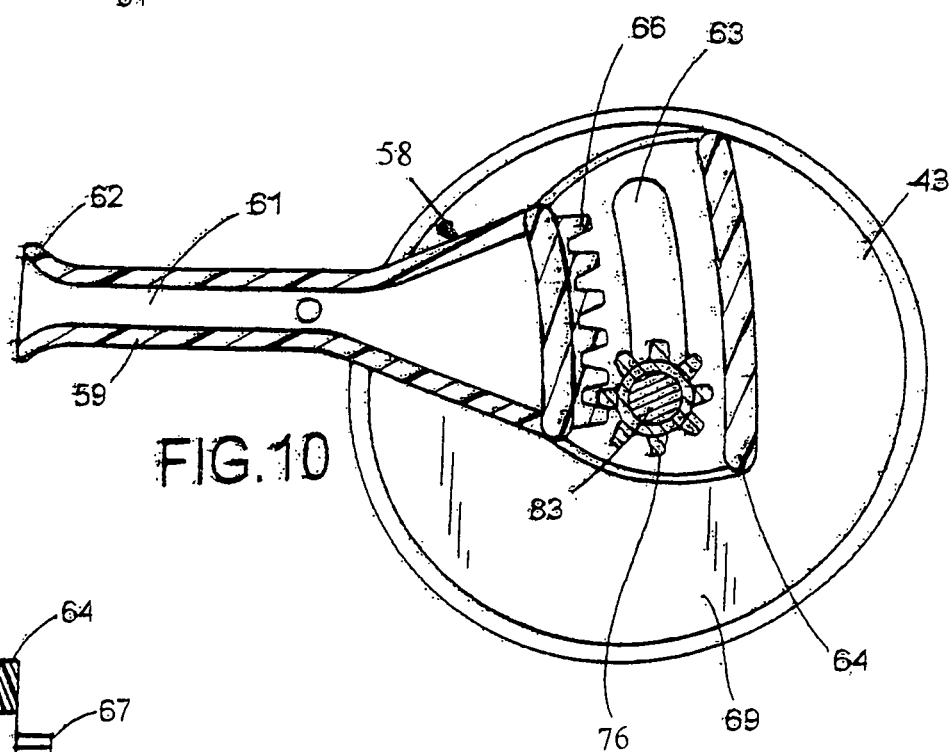
FIG. 10 is an enlarged sectional view taken along line 10-10 of FIG. 9.
Figure 11:
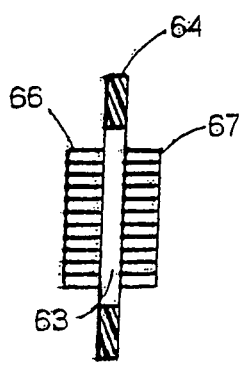
FIG. 11 is a sectional view taken along line 11-11 of FIG. 9.

Material level indicator 26, shown in FIGS. 4 and 5, has a housing 34 with a rearward extended tubular member or projection 36. A passage 40 of projection 36 is open to interior chamber 35 of housing 34. Outward directed pegs or bosses 37 and 38 are joined to opposite sides of projection 36. Projection 36 and bosses 37 and 38 function to mount housing 34 on side wall 21 of bin 20 as hereinafter described. A support 39, shown as a metal strap, also attaches housing 34 to side wall 21 of bin 20. A fastener 41, such as a screw, attaches the upper end of support to side wall 21 of bin 20. Additional supports can be used to attach housing 34 to side wall 20 of bin 20. A pair of visual members 42 and 43 rotatably mounted on housing 34 are located behind semi-cylindrical light transparent member or lens 44. Lens 44 is secured to housing 34 with a plurality of fasteners 45 as shown in FIGS. 7 and 8. Lens 44 also closes the open portion of chamber 35 to isolate the visual members 42 and 43 and motion transmitting apparatus 47 from the external environment. A single visual member can be rotatably mounted on housing 34 as an alternative to visual members 42 and 43.

Figure 6:
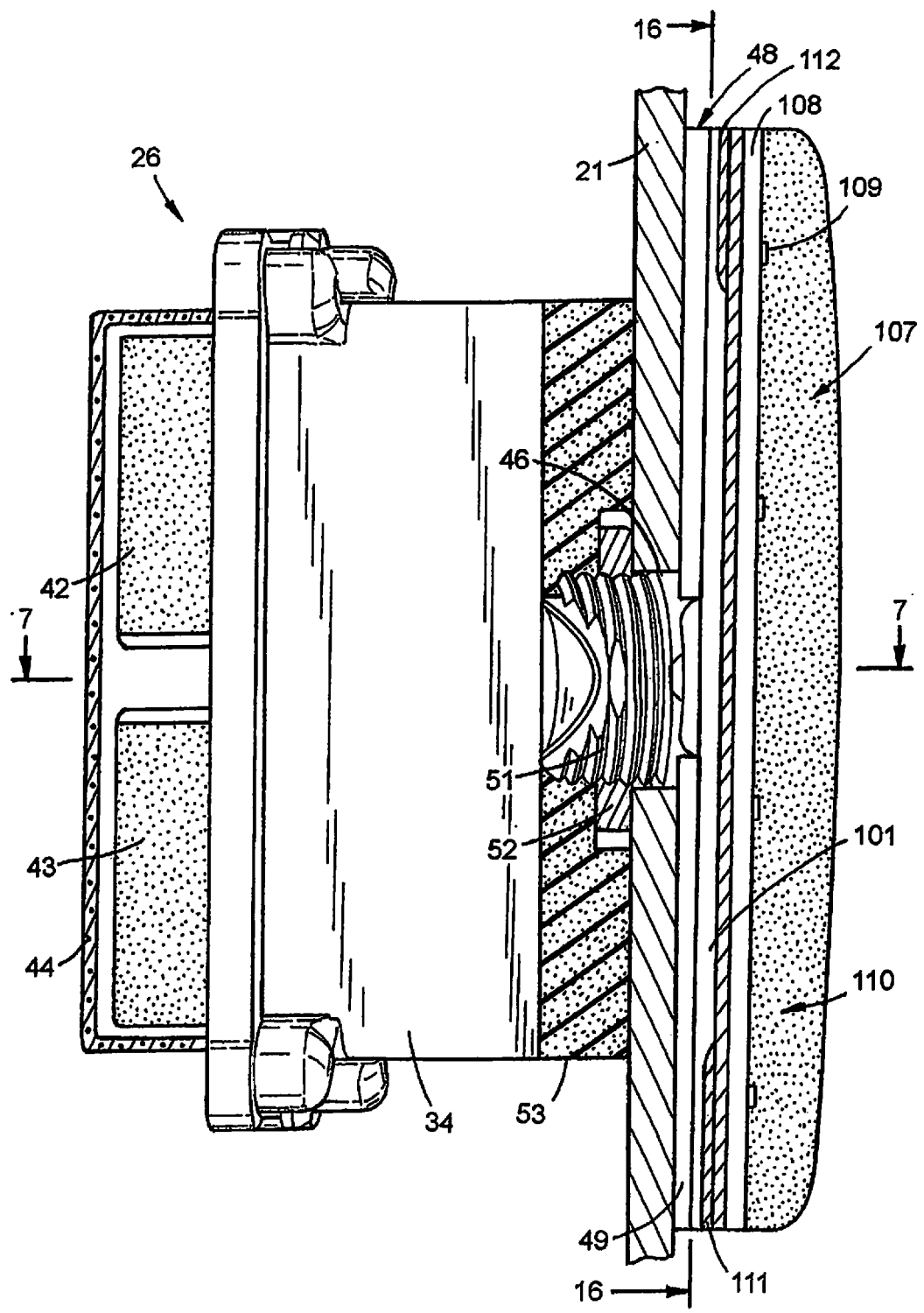
FIG. 6 is an enlarged sectional view taken along line 6-6 of FIG. 1.

Proceeding to FIGS. 6, 7 and 8, side wall 21 has an opening or cylindrical hole 46 open to interior chamber 23 of bin 20. A mount device 48 has a transverse bar 49 and a sleeve or boss 51. Boss 51 extends through hole 46 when bar 49 engages the inside surface of side wall 21 of bin 20. A nut 52 threaded on boss 51 retains boss 51 and bar 49 on side wall 21 of bin 20. A pad 53, of sealing material, such as closed cell plastic, interposed between the back of housing 34 and around boss 51 prevents water, snow, dirt, insects and air from flowing through hole 46 into interior chamber 23 of bin 20.

Figure 15:
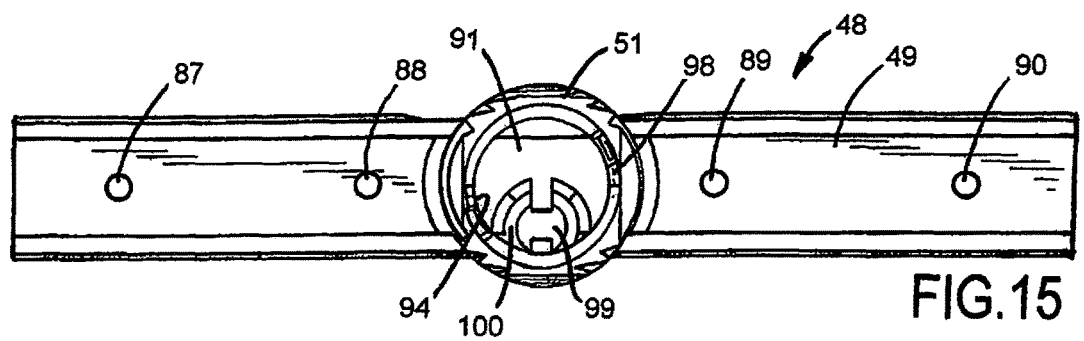
FIG. 15 is a sectional view taken along line 15-15 of FIG. 7.
Figure 16:
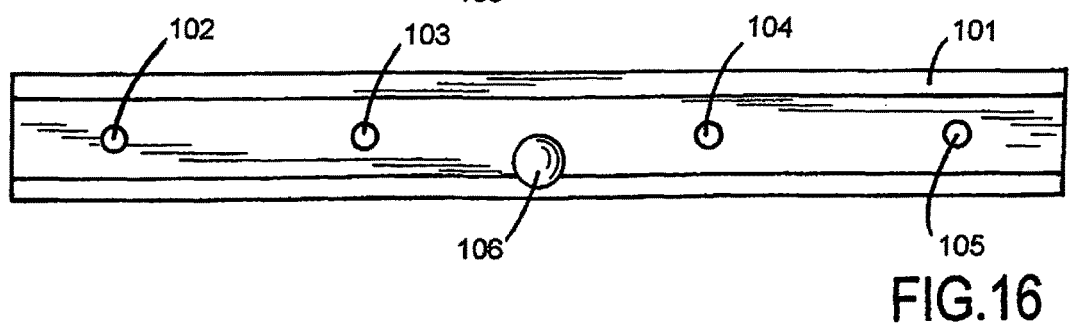
FIG. 16 is a sectional view taken along line 16-16 of FIG. 6.
Figure 17:
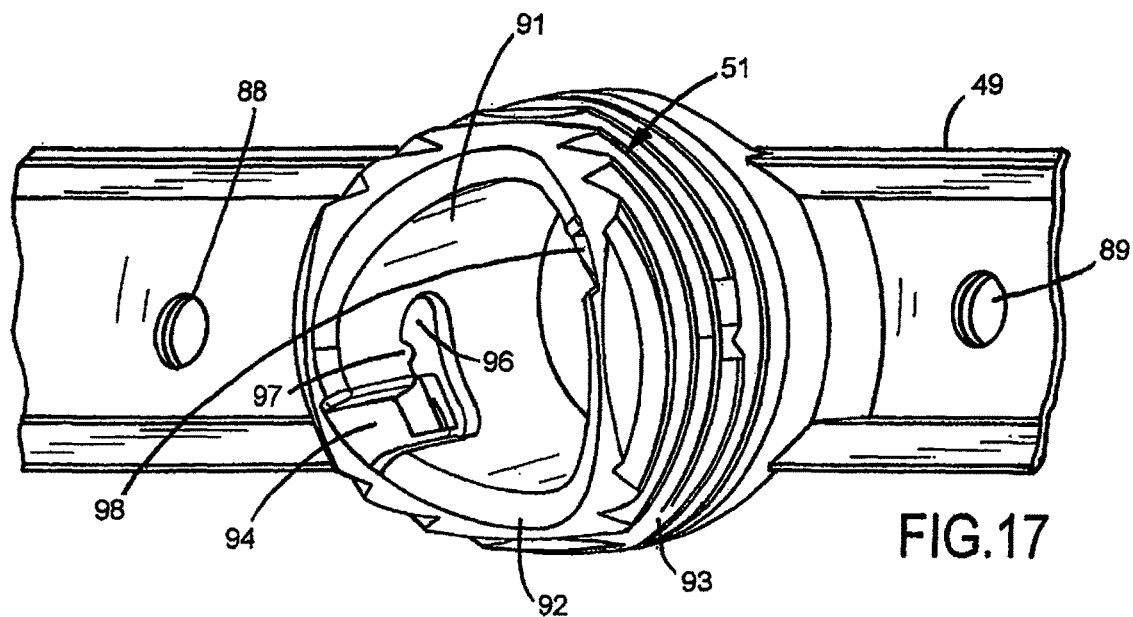
FIG. 17 is an enlarged perspective view of the middle portion of the mounting device bar shown in FIG. 15.
Figure 18:
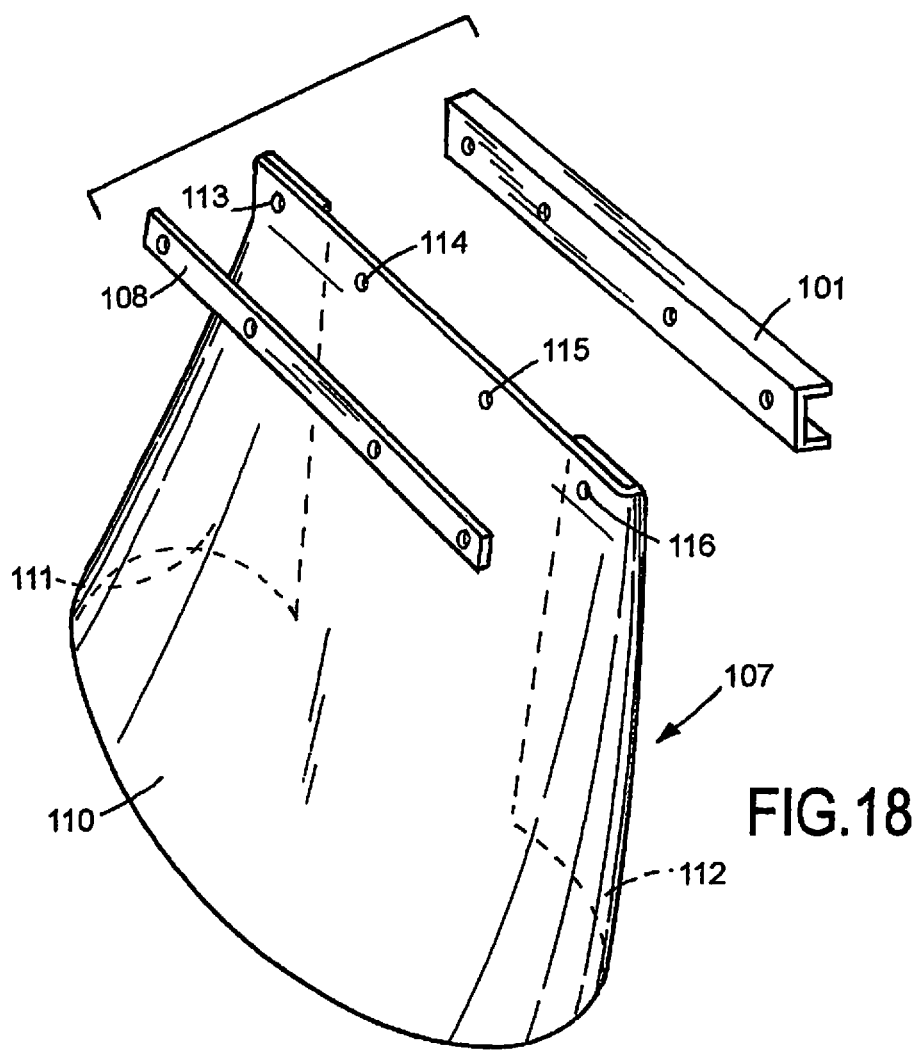
FIG. 18 is a perspective view of the actuator of the material level indicator.
Figure 19:
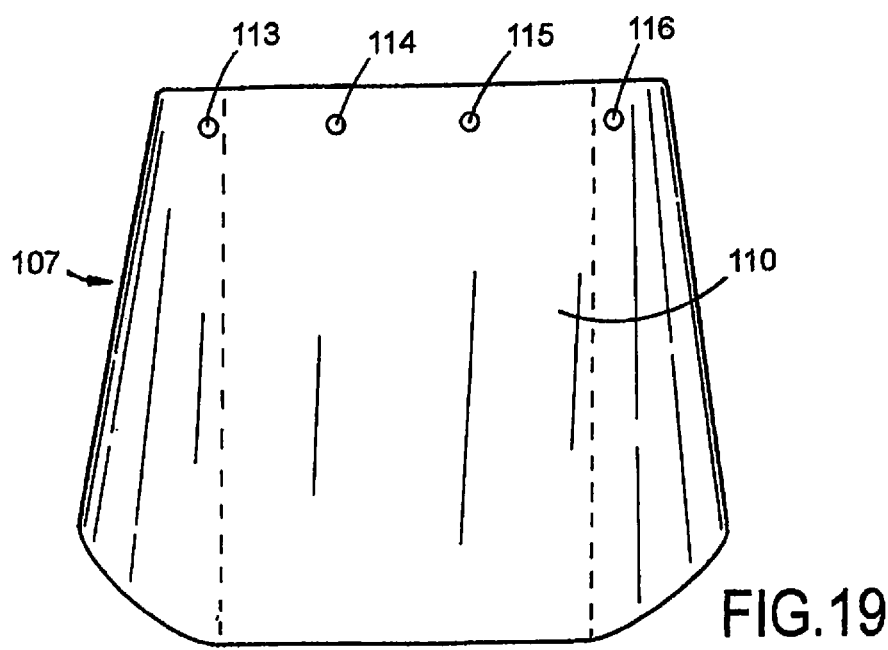
FIG. 19 is a front elevational view of the actuator of FIG. 18.

As shown in FIG. 15, boss 51 has a passage 91 and external threads 93 accommodating nut 52. The center of bar 49 has a recess 99 surrounded with a concave shaped wall 100. A second bar 101 has a plurality of holes 102, 103, 104 and 105 and a central concave wall 106 providing a recess. A plurality of bolts 109 extended through holes 102-105 and into threaded holes 87, 88, 89 and 90 secure bar 101 to bar 49.

A motion transmission apparatus 47 pivotally mounted on bars 49 and 101 operates to selectively move visual members 42 and 43 between light ON and dark OFF positions. The concave semi-spherical surfaces of walls 100 and 106 provide a generally spherical pocket accommodating a ball 57 joined to first and second members shown as rods or arms 54 and 56. Rod 54, shown in FIGS. 7 and 8, extends downward into interior chamber 23 of bin 20 adjacent the inside of side wall 21. Rod 56 extends generally horizontally into the passage 61 in tubular member 59 of a third member shown as body 58. Rods 54 and 56 are a one-piece arm or member having a generally right angle or 90-degree orientation. A ball 57 is joined to the apex portion of rods 54 and 56. The outside cylindrical surface of ball 57 is located in sliding engagement or free movement relative to the concave walls 100 and 106 of bars 49 and 101. Body 58 has a gear portion 64 having an arcuate slot 63 and a pair of arcuate teeth 66 and 67 adjacent opposite sides of slot 63. Teeth 66 and 67 cooperate with spur gears 76 and 82 on adjacent end walls 69 and 78 of visual members 42 and 43. Angular movement of gear portion 64 of body 58 responsive to angular movement of rods 54 and 56 rotate teeth 66 and 67 thereby rotating visual members 42 and 43 between light YES and dark NO positions to provide person 31 with visual information regarding the level of material in bin 20. When visual members 42 and 43 are in the dark NO positions, the wall 65 of body 58 at the upper end of slot 64 contacts axle 83 to stop the downward movement of body 58 and aligns the dark surfaces of visual members 42 and 43 with lens 44. As shown in FIG. 8, when the motion transmission apparatus 47 is in the light color YES position, body 58 contacts a stop member 117 located on the inside of tubular member 36 and aligns the light surfaces of visual members 42 and 43 with lens 44 whereby person 31 can visually view the material level indicator and determine the level of material 24 in bin 20.

Actuator 107, shown in FIGS. 6, 7, 8, 18 and 19, comprises a curved flexible body 110 of plastic, rubber, fabric material extended downwardly in bin chamber 23 adjacent the inside of side wall 21. Body 110 has opposite end sections 111 and 112 folded inwardly toward each other. The end sections 111 and 112 extend toward and contact the inside of side wall 21 to establish a seal on the opposite sides of body 110 to prevent the build-up of material behind actuator 107. The upper section of body 110 and end sections 111 and 112 has a plurality of holes 113, 114, 115 and 116 accommodating fasteners 109 that secure plate 108 and the upper section of body to member 101 of the mount device 48. The rod 54 extends downward adjacent the inside of body 110. Member 101 is also secured with fasteners 109 to bar 48. Body 110 protects rod 54 and ball 57 from the material 24 that applies an outwardly directed force, shown by arrow 125 which moves body 110 and rod 54 toward the inside surface of side wall 21 of bin 20.

Figure 12:
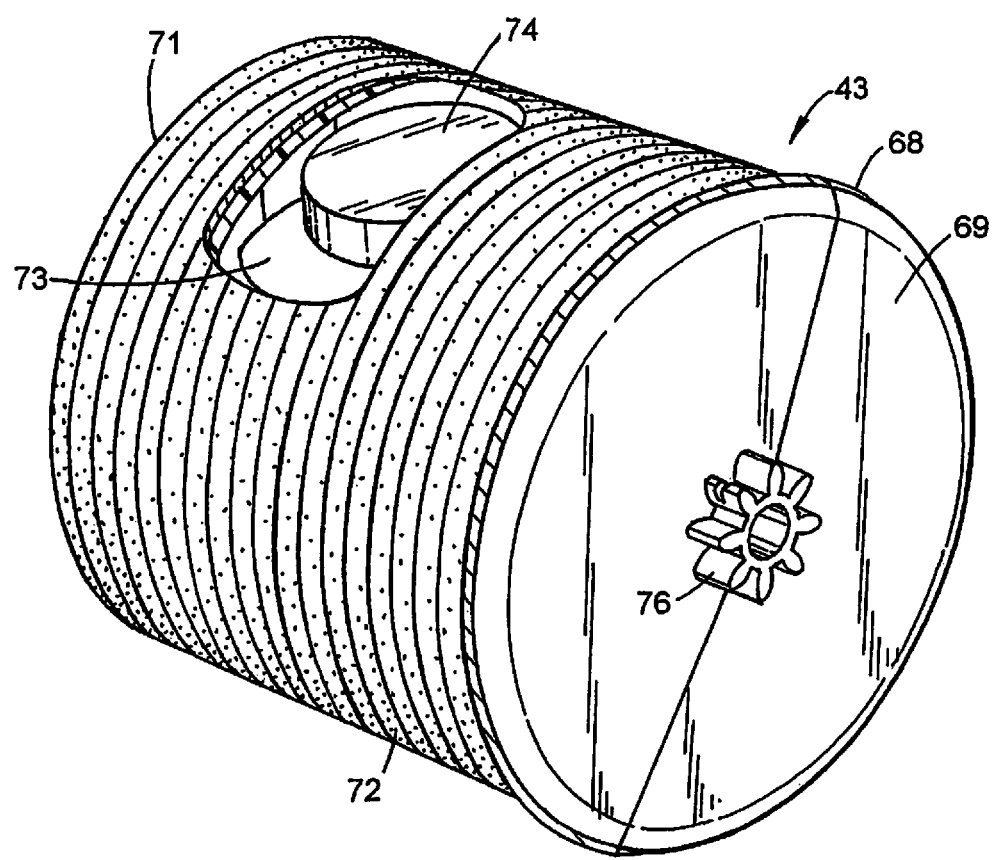
FIG. 12 is a perspective view, partly sectioned, of a visual member of the material level indicator.

Visual member 43, shown in FIG. 12, has a cylindrical wall 68 joined to circular end walls 69 and 71. A bright color tape 72, such as yellow, orange or green, is attached to one-half of cylindrical wall 68 and end wall 71. Bright color paints and plastic materials with light reflectors can be applied to cylindrical wall 68 as a replacement for the color tape 72. The remaining one-half of the cylindrical wall 68 is a dark color, such as black.

A permanent magnet 74 is located in a pocket 73 below cylindrical wall 68. Magnet 74 is operable to activate a sensor mounted on lens 44. Sensor generates an electric signal that activates a remote level indicator display. An example of the magnet and remote level indicator display is disclosed in U.S. Pat. No. 6,067,927. The disclosure of the remove level indicator system of U.S. Pat. No. 6,067,927 is incorporated herein. A spur gear 76 with an axial hole is joined to the central portion of end wall 69. The arcuate curvature of the rows of teeth 66 and 67 conforms with the arcuate curvature of slot 63. The width of slot 63 is substantially the same as the diameter of axle 83 whereby axle 83 maintains spur gears 76 and 82 in continuous engagement with teeth 66 and 67 on body 64.

Figure 13:
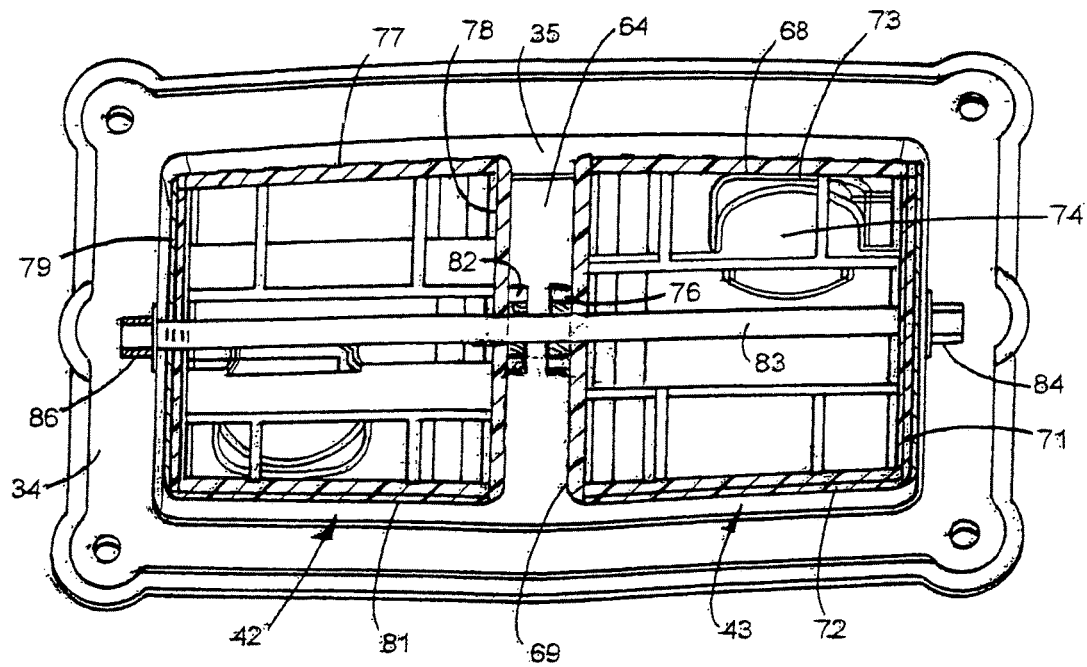
FIG. 13 is a front elevational view of the material level indicator with the front lens removed showing the visual members in the dark color or NO material level position.
Figure 14:
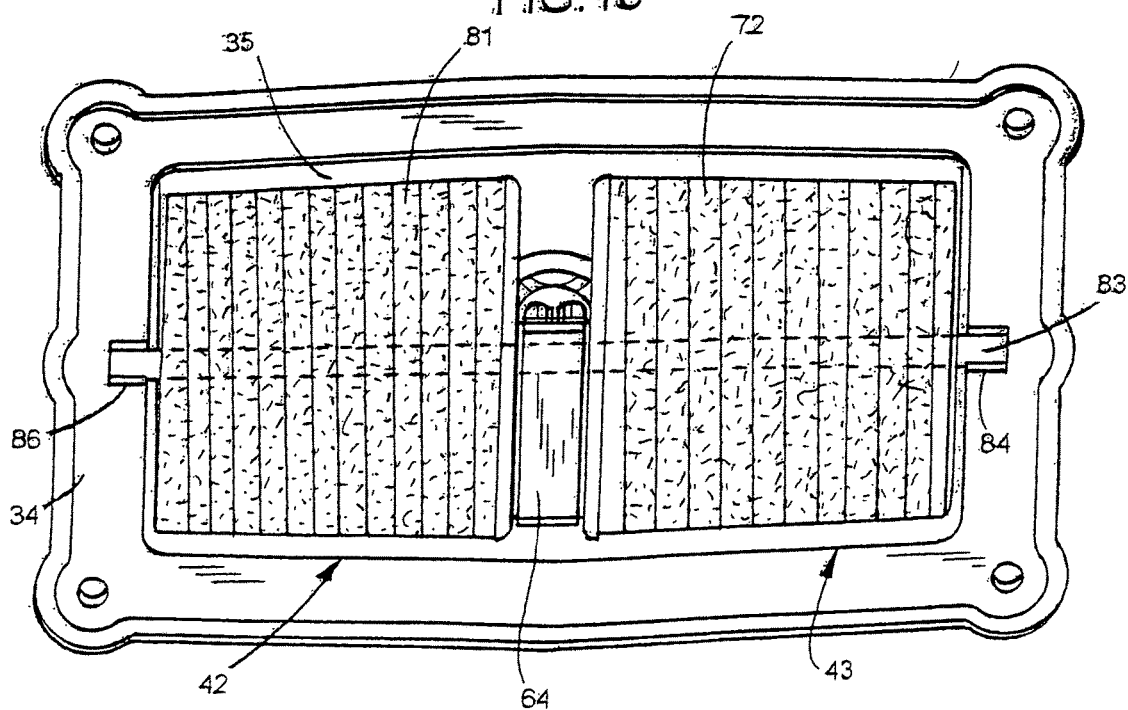
FIG. 14 is a front elevational view of the material level indicator with the front lens removed showing the visual members in the light color or YES material level position.

Visual members 42 and 43 are rotatably mounted on a common cylindrical axle 83. As shown in FIGS. 13 and 14, axle 83 has opposite ends located in recesses 84 and 86 in the side walls of housing 34. Axle 83 extends through spur gears 76 and 82 and slot 63 of body 64 and maintains spur gears 76 and 82 on mesh engagement with gear teeth 66 and 67 on body 64.

Motion transmission apparatus 47 and 58 is biased in a clockwise direction with a coil spring 126. As shown in FIGS. 7 and 8, spring 126 has a first end connected to tubular portion 59 of body 58 and a second end connected to a plug 127. Plug 127 threaded into the bottom wall of housing 34 can be turned to adjust the biasing force of spring 126. Spring 126 pulls body 58 downward, shown by arrow 128, and moves body 110 of actuator 107 away from side wall 21 of bin 20 when there is no material pressing against body 110. Body 58 has a stop wall 65 at the upper end of slot 63. When body 58 is in the NO material position, the stop wall 65 contacts axle 83 thereby retaining visual members 42 and 43 in the dark NO positions. Other types and designs of biasing devices can be used to apply a biasing force on body 58 and motion transmission apparatus 47.

In use, as material 24 is deposited in chamber 23 of bin 20 adjacent actuator 107, the material applies outward pressure, shown by arrow 125 in FIG. 8, on actuator 107. Actuator 107 is moved toward the inside of side wall 21 forcing rod 54 to pivot relative to the axis of ball 57 in a counter clockwise direction. The body 58 moves upward whereby the teeth 66 and 67 rotate spur gears 76 and 82 and visual members 42 and 43 in a clockwise direction to locate the bright colored tapes 72 adjacent light transparent lens 44. When the level of material is below actuator 107, as shown in FIG. 7, spring 126 moves actuator 107 away from side wall 21 of bin 20. Visual members 42 and 43 are rotated to the dark NO positions. Person 31 remote from bin 20 can visually observe the bright color and dark color displays of material levels indicators 26 to 29 shown in FIG. 1.

Figure 20:
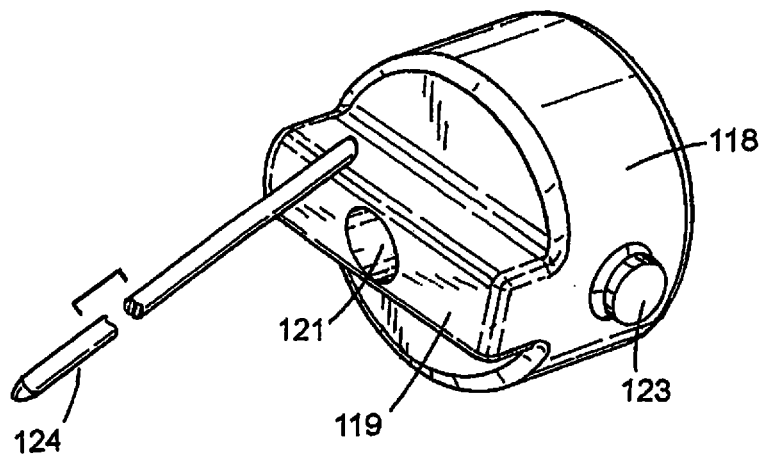
FIG. 20 is a perspective view of the plug used to mount the housing of the material level indicator on the bin side wall.
Figure 21:
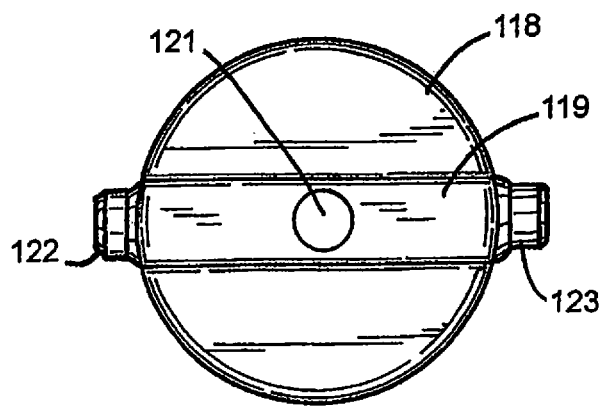
FIG. 21 is a front elevational view of FIG. 20.

The material level indicator 26 can be mounted on the bin side wall 21 of bin 20 during the construction of the bin. Material level indicator 26 can also be mounted on an existing bin from the outside of bin side wall 21. The hole 46 is drilled in bin side wall 21 at a selected location with a power cutting tool. A plug 118, shown in FIGS. 20 and 21, is inserted into chamber 91 of sleeve 51 with bosses 122 and 123 aligned with grooves 94 and 98. The plug 118 is turned to lock bosses 122 and 123 in the lateral pockets 96. The rod 56 extends through hole 121 in the lateral pockets 96. The rod 56 extends through hole 121 in plug 118. Actuator 107 is rolled into a generally cylindrical configuration around mount device 48. The mount device 48 and actuator 107 is moved through hole 46 into bin chamber 23. The cord 124 attached to rib 119 is used to pull sleeve 51 into hole 26 as shown in FIGS. 6, 7 and 8. Nut 52 threaded onto sleeve 51 holds sleeve 51 on side wall 21 and bar 49 in engagement with the inside surface of bin side wall 21. The plug 118 is then removed from sleeve 51 by rotating plug 118 in a counter clockwise direction to align bosses 122 and 123 with grooves 94 and 98. The plug 118 is then pulled off of sleeve 51. The housing 34 is mounted on sleeve 51 by inserting projection 36 into chamber 91 of sleeve 51 with pegs or bosses 37 and 38 aligned with grooves 94 and 98. The housing 34 is turned clockwise to position bosses 37 and 38 into pockets 96. Detent projections 97 retain bosses 37 and 38 in the pockets 96. The motion transmission rod 56 is inserted into passage 61 of arm 58 thereby connecting motion transmission apparatus 47.

Figure 22:
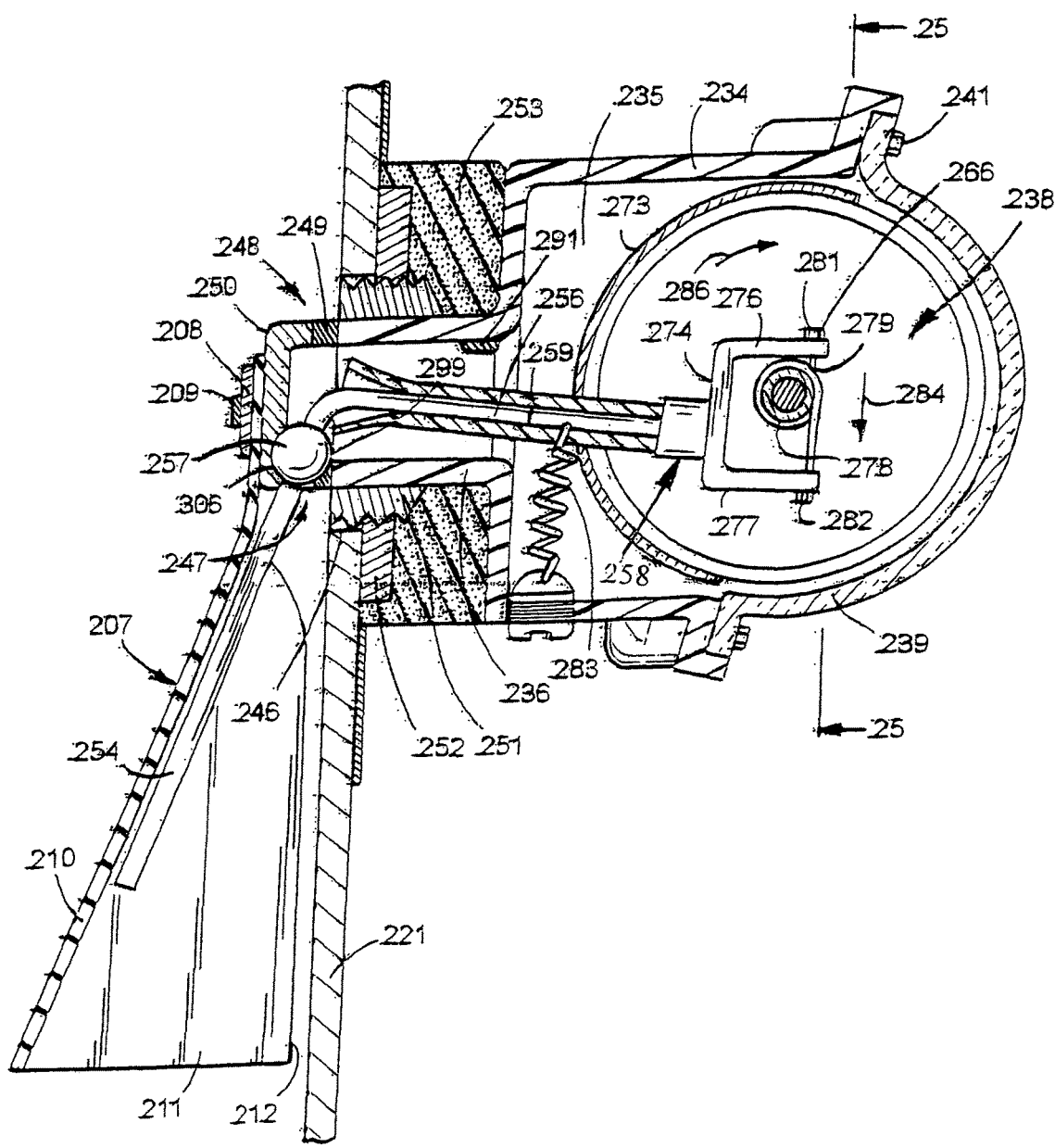
FIG. 22 is a sectional view according to FIG. 7 of a modification of the motion transmitting apparatus, showing the visual members in the dark color OFF position.
Figure 23:
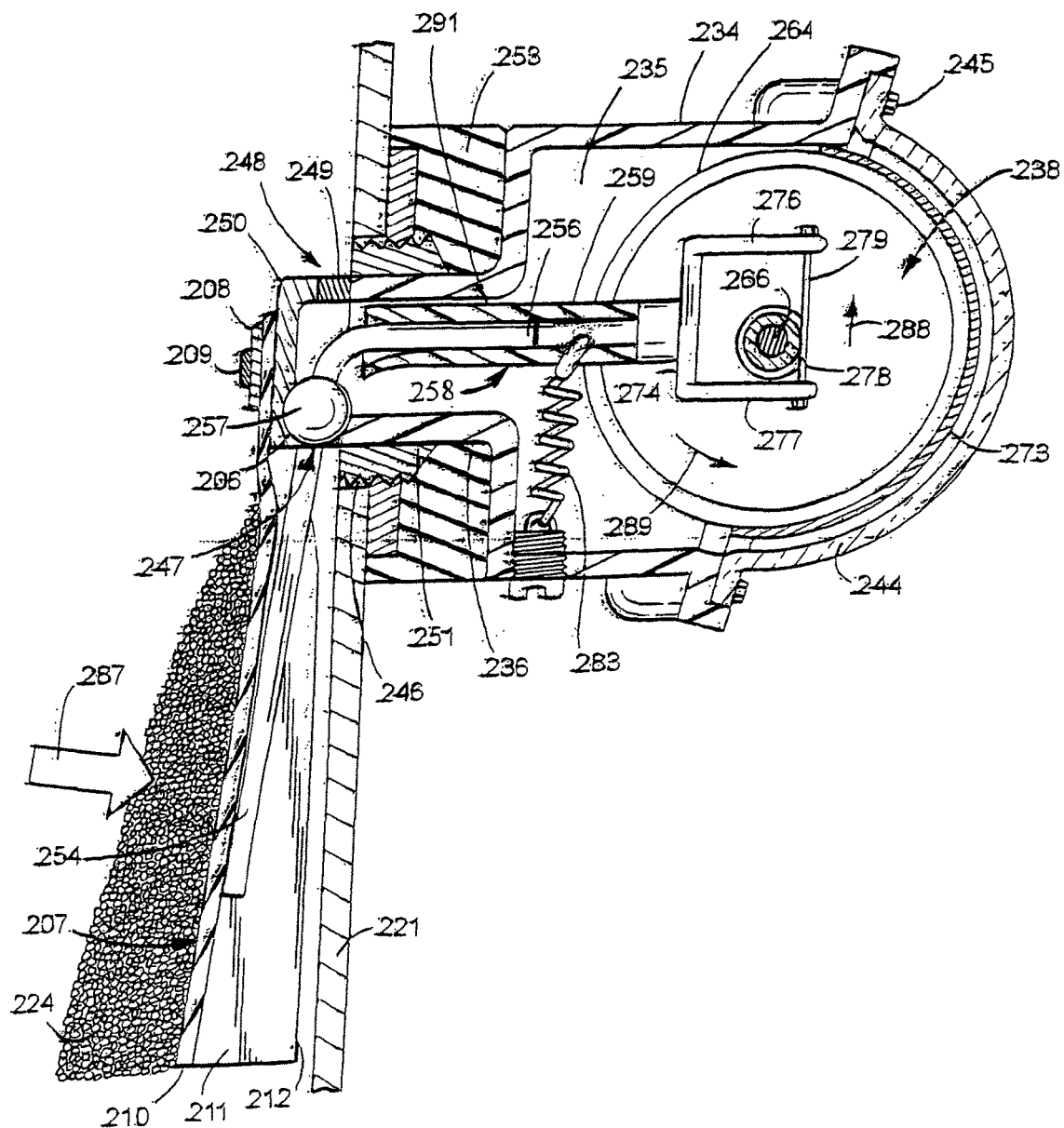
FIG. 23 is a sectional view according to FIG. 22 of the modification of the motion transmitting apparatus showing the visual members in the light color ON position.

A modification of the bin level indicator 200, shown in FIGS. 22 and 23, is illustrated in the dark color OFF position and light color ON position. When the indicator is in the dark color OFF position, shown in FIG. 22, the level of the material in the bin is below the indicator. As shown in FIG. 23, when the indicator is in the light color ON position, the level of the material in the bin is at the level of the indicator or above the level of the indicator. Indicator 200 has a body or housing 234 having a cylindrical projection 236 and an internal chamber 235. A pair of cylindrical visual members 237 and 238 are enclosed within chamber 235 with an arcuate lens 239 secured to housing 234 with fasteners 241. Lens 239 is a semi-cylindrical light transparent plastic member providing a window for remote viewing by a person of cylindrical members 237 and 238 to provide the person with visual information as to the level of material in a bin. A single visual member can be located in chamber 235 as an alternative to visual members 237 and 238.

Proceeding to FIGS. 22 and 23, side wall 221 of the bin has an opening or cylindrical hole 246 open to the interior chamber of the bin. A mount device 248 has a transverse bar 249 and a sleeve or boss 251. Boss 251 extends through hole 246 when bar 249 engages the inside surface of side wall 221 of the bin. A nut 252 threaded on boss 251 retains boss 251 and bar 249 on side wall 221 of the bin. A pad 253, of sealing material, such as closed cell plastic, interposed between the back of housing 234 and around boss 251 prevents water, snow, dirt, insects and air from flowing through hole 246 into the interior chamber of the bin. Boss 251 has a passage and external threads accommodating nut 252. The center of bar 249 has a recess 299 surrounded with a concave shaped wall. A second bar 250 has a central concave wall 306 providing a recess. One or more bolts 209 secure bar 250 to bar 249.

A motion transmission apparatus 247 rotatably mounted on bars 249 and 301 operates to selectively move visual members 237 and 238 between light color ON and dark color OFF positions. The concave semi-spherical surfaces of walls 306 provide a generally spherical pocket accommodating a ball 257 joined to rods or arms 254 and 256. Rod 254 extends downward into the interior chamber of the bin adjacent the inside of side wall 221. Rod 256 extends generally horizontally into the passage in tubular member 259 of body 258. Rods 254 and 256 are a one-piece arm or first and second members having a generally right angle or 90-degree orientation. Ball 257 is joined to the apex portion of rods 254 and 256. The outside cylindrical surface of ball 257 is located in sliding engagement or free movement relative to the concave walls 306 of bars 249 and 250.

An actuator 207 attached to bar 250 extends downward in the chamber of the bin adjacent rod 254. The material 224 in the bin moves actuator 207, shown by arrow 287 in FIG. 23, toward bin wall 221 and pivoting rods 254 and 256 in a counterclockwise direction. The pivoting motion of rods 254 and 256 causes visual members 237 and 238 to rotate to bright color ON positions. Actuator 207 comprises a convex curved flexible body 210 of plastic, rubber or fabric material. Body 210 has opposite ends folded inwardly toward bin side wall 221. Body end 211, shown in FIGS. 22 and 23, has an upright edge 212 located in close relationship with the inside of side wall 221 of the bin. The space between body 210 and the inside of bin wall 221 does not contain material 224 thereby allowing body 310 to flex inwardly when subjected to the pressure of the material 224 against body 310. A plate 208 and bolt 209 secure the upper section of body 210 to bar 250.

Figure 24:
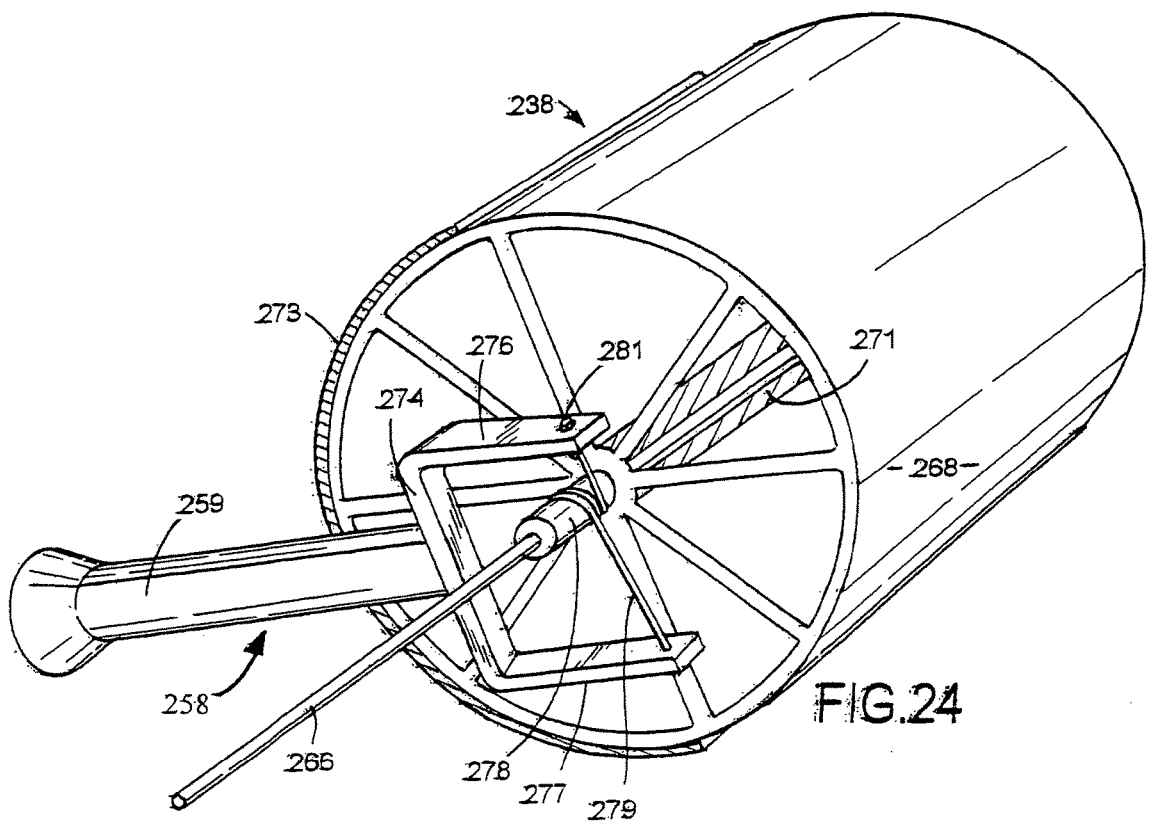
FIG. 24 is a perspective view of the modified motion transmitting apparatus shown in FIGS. 22 and 23.
Figure 25:
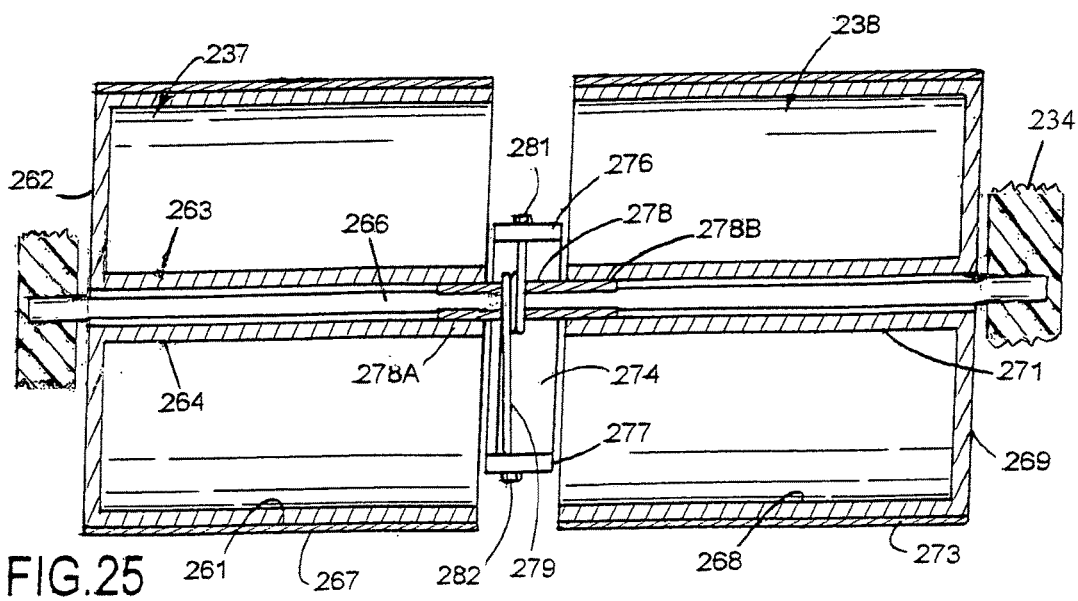
FIG. 25 is a sectional view taken along line 25-25 of FIG. 22.

As shown in FIG. 25, visual member 237 is a cylindrical member having a continuous cylindrical perimeter wall 261 joined to an end wall 262. A central sleeve 263 joined to end wall 262 has an axial passage 264 accommodating a rod or axle 266. Opposite ends of axle 266 are mounted on housing 234 to fix the location of visual members 237 and 238 on housing 234. A bright color member 267 is located on a section of cylindrical wall 261. Visual member 238 has the same size and structure as visual member 237. As shown in FIGS. 24 and 25, visual member 238 has a continuous cylindrical perimeter wall 268 joined to an end wall 269. A central sleeve 271 joined to end wall 269 has a horizontal passage 272 accommodating axle 266 thereby locating visual members 237 and 238 in a side-by-side relationship. A bright color member 273 is located on a section of cylindrical wall 268. Color members 267 and 273 are bright color tapes, such as yellow, orange or green, attach with an adhesive to one-half of cylindrical walls 261 and 268. Bright color paints and plastic materials with light reflecting properties can be applied to cylindrical walls 261 and 268 as a replacement for the color tapes. The remaining one-half of cylindrical walls 261 and 268 are dark colors, such as black and grey.

The outer end of tubular member 259 is secured to a yoke or channel member 274 having arms or flanges 276 and 277. A tubular member 278 rotatably mounted on axle 266 located between flanges 276 and 277 has ends 278A and 278B located in passages 264 and 272 in sleeves 263 and 271 of visual members 237 and 238. Ends 278A and 278B have a tight force fit with sleeves 263 and 271 whereby rotation of tubular member 278 results in rotation of visual members 237 and 238 between bright ON and dark OFF positions. An adhesive can be used to secure ends 278A and 278B to sleeves 263 and 271. A flexible member 279 is wrapped a number of turns around tubular member 278. One end 281 of flexible member 279 is anchored on flange 276. The other end 282 of flexible member 279 is anchored on flange 277. Ends 281 and 282 secure flexible member 279 to channel member 274 whereby pivotal up and down movements of channel member 274 results in rotation of tubular member 278 and visual members 237 and 238. Flexible member 279 can be a cord, belt, string, web, cable, rope or one or more threads wrapped around tubular member 278 and anchored on flanges 276 and 277. Flexible member 279 can be coated with a resin, such as colophony, or a material that inhibits slippage of flexible member 279 on tubular member 278.

In use, as shown in FIG. 22, when actuator 207 is not subjected to any material in the bin, spring 283 biases member 259 and channel member 274 in a downward direction shown by arrow 284. Flexible member 279 rotates tubular member 278 clockwise and rotating visual members 237 and 238, shown by arrow 286, to locate the dark portions of visual members 237 and 238 to the dark OFF positions thereby providing visual information to a person that the level of material in the bin is below the indicator. As the material 224 is deposited in the bin it applies pressure on actuator 207, shown by arrow 287 in FIG. 23, moving motion transmission apparatus 247 counter clockwise, shown by arrow 288 causing rotation of visual members 237 and 238, shown by arrow 289, to locate color members 267 and 273 the bright ON positions thereby providing visual information to a person that the level of material in the bin is at or above the indicator.

Figure 26:
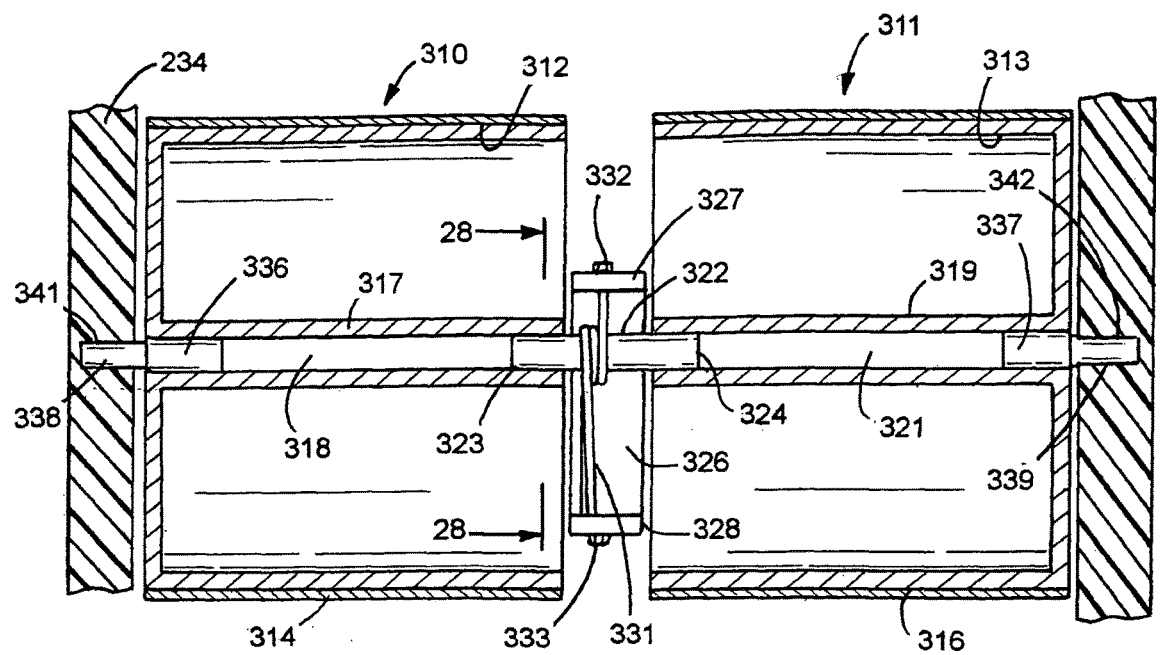
FIG. 26 is a sectional view according to FIG. 25 of a modification of the structure connecting the visual members to the housing of the indicator.
Figure 27:
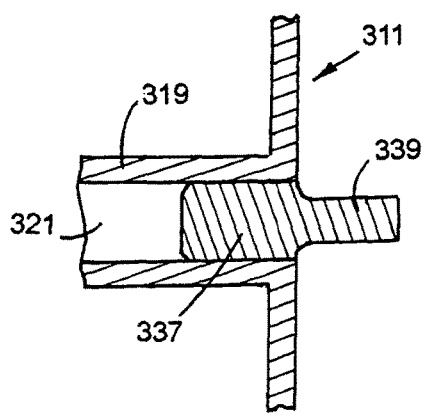
FIG. 27 is an enlarged sectional view of the structure connecting the visual members to the housing of the indicator.
Figure 28:
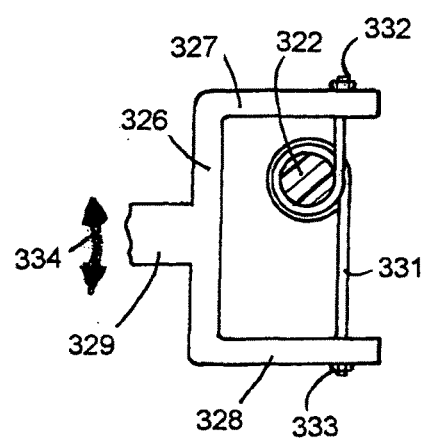
FIG. 28 is a sectional view taken along line 28-28 of FIG. 26.

Another embodiment of the visual members and motion contrail for the visual members is shown in FIGS. 26 to 28. Visual members 310 and 311 have the same structures as visual members 237 and 238 including continuous cylindrical walls 312 and 313 supporting bright color members 314 and 316. Visual member 310 has a central tubular sleeve 317 having an axial passage 318 with open opposite ends. Visual member 311 has a central tubular sleeve 319 having an axial passage 321 aligned with axial passage 318 of sleeve 317. A cylindrical member 322 has opposite ends 323 and 324 inserted into adjacent ends of passages 318 and 321 of sleeves 317 and 319. Ends 323 and 324 have tight press fits on sleeves 317 and 319 to drivably connect visual members 310 and 311 in side-by-side relationship. Adhesives can be used to secure cylindrical member 322 to sleeves 317 and 319. As shown in FIGS. 26 and 28, a yoke or channel member 326 having arms or flanges 327 and 328 is secured to a member 329. Member 329 is tubular member 259 shown in FIGS. 22 and 23 that moves up and down, shown by arrow 334 responsive to the movement of actuator 307. A flexible member 331 wrapped around cylindrical member 322 has ends 332 and 333 anchored to flanges 327 and 328. Up and down movement of channel member 326 rotates cylindrical member 322 which in turn rotates visual members 310 and 311 between bright color ON and dark color OFF positions. Axles 336 and 337 inserted into outer ends of passages 318 and 321 have outer cylindrical ends 338 and 339 located in pockets 341 and 342 in the end walls of housing 234. Axles 336 and 337 rotatably mount visual members 310 and 311 on housing 234 for movement between bright color ON positions and dark color OFF positions to provide a person with visual information regarding the level of the material in a bin.

The foregoing disclosure of the invention describes and illustrates several embodiments of the material level indicator of the invention. Modifications, changes in parts and arrangement of parts and materials may be made to the indicator defined in the claims herein by persons skilled in the art without departing from the invention.

The invention claimed is:

1. A combined material storage bin and visual indicator for providing a person with information regarding the level of material located within the bin comprising:

said material storage bin having a side wall surrounding a chamber for holding material,
said side wall having at least one hole open to the inside and outside of the side wall,
said visual indicator mounted on side wall adjacent the hole operable to provide a person located remote from the material storage bin visual information regarding the level of material located within the material storage bin,
said indicator comprising:
a housing having an internal chamber,
a pair of generally cylindrical visual members having first portions and second portions spaced from the first portions located within the internal chamber of the housing,
a bright color member on the first portions of the visual members,
said second portions of the visual members each having a dark color,
a light transparent member attached to the housing enclosing the visual members within the interior chamber of the housing,
a mount device connecting the housing to the side wall of the material storage bin, said mount device including
a horizontal bar engageable with the inside of the side wall of the material storage bin,
a boss joined to the horizontal bar extended through the hole in the side wall of the material storage bin,
a fastener cooperating with the boss to retain the bar in engagement with the inside of the side wall of the bin,
an actuator connected to the mount device located in the material storage bin adjacent the hole in the side wall of the material storage bin for movement from a first position to a second position and from the second position back to the first position,
said actuator including a flexible body having a top portion and the remainder portion of the body extended downward into the chamber of the material storage bin,
a plate engageable with the top portion of the body,
at least one fastener attaching the plate and top portion of the body to the horizontal bar to hold the top portion of the body on the horizontal bar,
a motion transmission apparatus operatively connecting the actuator to the visual members whereby movement of the actuator moves the visual members to locate the bright color member adjacent the transparent member whereby the bright color member is visible by a person remote from the material storage bin to provide the person with information regarding the level of material in the material storage bin,
said motion transmission apparatus comprising:
a first member located adjacent the body of the actuator,
a second member extended into the chamber of the housing,
a spherical ball connected to the first member and to the second member,
a third member attached to the second member having first and second arcuate segments of teeth and an arcuate slot generally concentric with the first and second arcuate segments of teeth,
said horizontal bar and said plate having segmented spherical surfaces providing a pocket for the spherical ball allowing the first and second members to move between the first and second positions,
a first spur gear joined to one visual member engageable with the first arcuate segment of teeth,
a second spur gear joined to another visual member engageable with the second arcuate segment of teeth,
an axle mounted on the housing and extended through the slot in the member, and
said visual members and first and second spur gears being rotatably mounted on the axle whereby in response to movement of the motion transmission apparatus by the actuator the bright color members and dark color second portion of the visual markers are selectively located adjacent the transparent member and visible by a person located remote from the material storage bin to provide the person with visual information concerning the level of material in the material storage bin.

2. The combined material storage bin and visual indicator of claim 1 wherein:
the body of the actuator is a flexible sheet member having inwardly directed end portions.

3. The combined material storage bin and visual indicator of claim 1 including:
a biasing member connected to the housing and motion transmission apparatus for biasing the motion transmission apparatus to a position locating the second portions of the visual members adjacent the transparent member and the body of the actuator spaced from the upright wall of the material storage bin.

4. The combined material storage bin and visual indicator of claim 1 wherein:
the housing includes
a projection extended into the boss, and
said projection and boss having cooperating members operable to secure the projection to the boss.

5. The combined material storage bin and visual indicator of claim 4 wherein:
said cooperating members include
a pair of outwardly directed pegs on the projection and
a pair of grooves and lateral pockets open to the grooves in the boss adapted to accommodate the pegs to secure the projection to the boss.

6. A combined material storage bin and visual indicator for providing a person with information regarding the level of material located within the bin comprising:
a material storage bin having a side wall surrounding a chamber for holding material,
said side wall having at least one hole open to the inside and outside of the side wall,
a visual indicator mounted on the side wall operable to provide a person located remote from the material storage bin with visual information regarding the level of material located within the material storage bin,
said visual indicator comprising:
a housing having an internal chamber,
at least one visual member movably mounted on the housing, said visual member having a first portion and a second portion spaced from the first portion located in the internal chamber of the housing,
a bright color member on the first portion of the visual member,
said second portion of the visual member having a dark color,
a light transparent member attached to the housing enclosing the visual member within the interior chamber of the housing,
a mount device for connecting the housing to the side wall of the material storage bin, said mount device including
an elongated bar located within the material storage bin engageable with the inside of the side wall of the material storage bin, a boss joined to the elongated bar extended through the hole in the side wall of the material storage bin, said boss having a chamber open to the internal chamber of the housing,
a fastener cooperating with the boss to retain the elongated bar in engagement with the inside of the side wall of the material storage bin,
said housing having a projection located within the chamber of the boss,
said projection and boss having cooperating members operable to retain the projection on the boss thereby retaining the housing on the mount device,
an actuator connected to the mount device locatable within the chamber of the material storage bin for movement from a first position to a second position and from the second position back to the first position,
said actuator including a flexible body extended downwardly from the elongated bar into the chamber of the material storage bin,
a plate for holding the body on the elongated bar,
at least one fastener attaching the plate and body to the elongated bar,
a motion transmission apparatus connecting the actuator to the visual member whereby movement of the actuator between its first and second positions selectively moves the visual member to locate the bright color member adjacent the transparent member or the dark color second portion of the visual member adjacent the transparent member whereby the bright color member or the dark color second portion of the visual member is visible by a person located remote from the material storage bin to provide the person with visual information concerning the level of material in the material storage bin.

7. The combined material storage bin and visual indicator of claim 6 wherein:
the body of the actuator is a flexible sheet member having end portions extended toward the side wall of the material storage bin.

8. The combined material storage bin and visual indicator of claim 6 including:
a biasing member connected to the housing and motion transmission apparatus for biasing the motion transmission apparatus to a position locating the second portion of the visual member adjacent the transparent member and the body of the actuator spaced from the upright side wall of the material storage bin.

9. The combined material storage bin and visual indicator of claim 6 wherein:
said cooperating members include:
a pair of outwardly directed pegs on the projection and
a pair of grooves and lateral pockets open to the grooves in the boss adapted to accommodate the pegs to retain the projection on the boss.

10. A combined material storage bin and visual indicator for providing a person with information regarding the level of material located within the bin comprising:
said material storage bin having a side wall surrounding a chamber for holding material,
said side wall having at least one hole open to the inside and outside of the side wall,
said visual indicator mounted on the side wall operable to provide a person located remote from the material storage bin with visual information regarding the level of material located within the material storage bin,
said visual indicator comprising:
a housing having an internal chamber,
at least one visual member movably mounted on the housing, said visual member having a first portion and a second portion spaced from the first portion located in the internal chamber of the housing,
a bright color member on the first portion of the visual member,
said second portion of the visual member having a dark color,
a light transparent member attached to the housing enclosing the visual member within the interior chamber of the housing,
a mount device for connecting the housing to the side wall of the material storage bin, said mount device including
an elongated bar located within the material storage bin engageable with the inside of the side wall of the material storage bin,
a boss joined to the elongated bar extended through the hole in the side wall of the material storage bin,
a fastener cooperating with the boss to retain the elongated bar in engagement with the inside of the side wall of the material storage bin,
an actuator connected to the mount device locatable within the chamber of the material storage bin for movement from a first position to a second position and from the second position back to the first position,
said actuator including a flexible body extended downwardly from the elongated bar into the chamber of the material storage bin,
a plate for holding the body to the elongated bar,
at least one fastener attaching the plate and body to the elongated bar,
a motion transmission apparatus connecting the actuator to the visual member whereby movement of the actuator between its first and second positions selectively moves the visual member to located the bright color member adjacent the transparent member or the dark color second portion of the visual member adjacent the transparent member whereby the bright color member or the dark color second portion of the visual member is visible by a person located remote from the material storage bin to provide the person with visual information concerning the level of material in the material storage bin,
the motion transmission apparatus includes:
a first member located adjacent the flexible body,
a second member extended into the chamber of the housing,
a spherical ball connected to the first member to the second member,
said elongated bar and said plate having segmented spherical surfaces providing a pocket for the spherical ball allowing the first and second members to move between said first and second positions in response to movement of the actuator.

11. The combined material storage bin and visual indicator of claim 10 wherein:
the motion transmission apparatus includes:
a third member joined to the second member,
said third member having an arcuate segment of teeth and an arcuate slot generally concentric with the arcuate segment of teeth,
a spur gear joined to the visual member engageable with the arcuate segment of teeth,
an axle mounted on the housing and extended through the slot in the third member, and
said visual member and spur gear being rotatably mounted on the axle whereby the bright color member and dark color second portion of the visual member are selectively located adjacent the transparent member and visible by a person located remote from the material storage bin to provide the person with visual information concerning the level of material in the material storage bin.

12. The combined material storage bin and visual indicator of claim 10 wherein:
the motion transmission apparatus includes:
a third member joined to the second member and movable with the second member to first and second positions in response to movement of the actuator,
a sleeve having an axial passage connected to the visual member,
an axle mounted on the housing extended through the passage of the sleeve for rotatably mounting the sleeve on the axle,
a flexible member connected to the third member,
said flexible member including a portion thereof wound around the sleeve,
said flexible member being moveable with the third member to rotate the sleeve and visual member connected to the sleeve whereby the bright color member and dark color second portion of the visual member are selectively located adjacent the transparent member and visible by a person located remote from the material storage bin to provide the person with visual information concerning the level of material in the material storage bin.

13. The combined material storage bin and visual indicator of claim 12 wherein:
the third member includes flanges located adjacent opposite sides of the sleeve,
said flexible member being connected to the flanges, and
said portion of the flexible member wound around the sleeve being located between the flanges.

14. The combined material storage bin and visual indicator of claim 10 wherein:
the motion transmission apparatus includes:
a third member joined to the second member and movable with the second member to first and second positions in response to movement of the actuator,
a sleeve connected to the visual member,
at least one axle mounted on the housing rotatably mounting the visual member on the housing,
a flexible member connected to the third member,
said flexible member having a portion thereof wound around the sleeve,
said flexible member being moveable with the third member to rotate the sleeve and visual member connected to the sleeve whereby the bright color member and dark color second portion of the visual member are selectively located adjacent the transparent member are visible by a person located remote from the material storage bin to provide the person with visual information concerning the level of material in the material storage bin.

15. The combined material storage bin and visual indicator of claim 14 wherein:
the third member includes flanges located adjacent opposite sides of the sleeve,
said flexible member being connected to the flanges, and
said portion of the flexible member wound around the sleeve being located between the flanges.

16. An indicator for providing visual information to a person regarding the level of material located within a bin having an upright wall comprising:
a housing having an internal chamber,
a pair of generally cylindrical visual members having first portions and second portions spaced from the first portions,
first color members on the first portions of the visual members,
said second portions of the visual members having a second color,
said first and second colors are visually contrasting colors,
a light transparent member attached to the housing enclosing the visual members within the internal chamber of the housing,
an actuator adapted to be located within the bin for movement from a first position to a second position and from the second position back to the first position,
said actuator including a generally flexible body extended downwardly into the bin,
a bar adapted to be located within the bin and engageable with the upright wall of the bin,
a member securing the flexible body of the actuator to the bar and locating the flexible body downwardly from the bar into the bin,
a motion transmission apparatus connecting the actuator to the visual members whereby movement of the actuator from a first position to a second position moves the visual members to locate the first color members adjacent the transparent member and movement of the actuator from the second position to the first position moves the visual members to locate the second color of the visual members adjacent the transparent member whereby the first color members and second color of the visual members are separate, visible by a person located remote from the bin to provide the person with information regarding the level of material in the bin,
said motion transmission apparatus comprising:
a first member located adjacent the flexible body,
a second member extended into the chamber of the housing,
a spherical ball connecting the first member to the second member,
a third member attached to the second member, said third member having first and second arcuate segments of teeth and an arcuate slot generally concentric with the first and second arcuate segments of teeth,
a boss connected to the bar,
a fastener attached to the boss for holding the bar in engagement with the upright wall of the bin,
said bar and said third member securing the body to the actuator having segmented spherical surfaces providing a pocket for the spherical ball allowing the first and second members to move between first and second positions,
a first spur gear joined to one visual member engageable with the first arcuate segment of teeth,
a second spur gear joined to another visual member engageable with the second arcuate segment of teeth,
an axle mounted on the housing and extended through the slot in the third member, and
said visual members and first and second spur gears being rotatably mounted on the axle whereby in response to movement of the motion transmission apparatus by the actuator the bright color members and dark color second portion of the visual members are selectively located adjacent the transparent member and visible by a person located remote from the bin to provide the person with visual information concerning the level of material in the bin.

17. The indicator of claim 16 wherein:
each of said visual members has opposite end walls and a cylindrical wall joined to the end walls,
said cylindrical wall having a circumference including said first and second portions of the visual members, and
said first color member being located in about one-half of the circumference of the cylindrical wall.

18. The indicator of claim 16 wherein:
the body of the actuator is a flexible sheet member having end portions adapted to extend toward the side wall of the bin.

19. The indicator of claim 16 wherein:
a body of the actuator has a middle inside portion, and
the first member of the motion transmission apparatus is located adjacent a middle inside portion of the body of the actuator.

20. The indicator of claim 16 including:
a biasing member connected to the housing and motion transmission apparatus for biasing the motion transmission apparatus to a position locating the second portions of the visual members adjacent the transparent member and the body of the actuator spaced from the upright wall of the bin.

21. The indicator of claim 16 wherein:
the motion transmission apparatus includes:
a third member joined to the second member and movable with the second member to first and second positions in response to movement of the actuator,
a sleeve having an axial passage connected to the visual member,
an axle mounted on the housing extended through the passage of the sleeve for rotatably mounting the sleeve on the axle,
a flexible member connected to the third member,
said flexible member including a portion thereof wound around the sleeve,
said flexible member being moveable with the third member to rotate the sleeve and visual member connected to the sleeve whereby the bright color member and dark color second portion of the visual member are selectively located adjacent the transparent member and visible by a person located remote from the bin to provide the person with visual information concerning the level of material in the bin.

22. The indicator of claim 21 wherein:
the third member includes flanges located adjacent opposite sides of the sleeve,
said flexible member being connected to the flanges, and
said portion of the flexible member wound around the sleeve being located between the flanges.

23. The indicator of claim 16 wherein:
the motion transmission apparatus includes:
a third member joined to the second member and movable with the second member to first and second positions in response to movement of the actuator,
a sleeve connected to the visual member,
at least one axle mounted on the housing rotatably mounting the visual member on the housing,
a flexible member connected to the third member,
said flexible member having a portion thereof wound around the sleeve,
said flexible member being moveable with the third member to rotate the sleeve and visual member connected to the sleeve whereby the bright color member and dark color second portion of the visual member are selectively located adjacent the transparent member are visible by a person located remote from the bin to provide the person with visual information concerning the level of material in the bin.

24. The indicator of claim 23 wherein:
the third member includes flanges located adjacent opposite sides of the sleeve,
said flexible member being connected to the flanges, and
said portion of the flexible member wound around the sleeve being located between the flanges.

25. An indicator for providing visual information to a person regarding the level of material located within a bin having a side wall and a chamber for holding the material comprising:
a housing having an internal chamber,
at least one visual member movably mounted on the housing,
said visual member having a first portion and a second portion spaced from the first portion located in the internal chamber of the housing,
a first color member on the first portion of the visual member,
said second portion of the visual member having a second color,
said first color member and second color are visually contrasting colors,
a light transparent member attached to the housing enclosing the visual member within the chamber of the housing,
an actuator locatable within the chamber of the bin for movement from a first position to a second position by material in the bin and from the second position to the first position,
said actuator including a flexible body and extended downwardly into the chamber of the bin,
a bar adapted to be located within the bin and engageable with the upright wall of the bin,
a member connecting the flexible member to the bar,
a boss connected to the bar,
said boss having a chamber,
a fastener attached to the boss adapted to hold the boss and bar in engagement with the side wall of the bin,
said housing having a projection located within the chamber of the boss,
said projection and boss having cooperating members operable to retain the projection on the boss thereby retaining the housing on the boss, and
a motion transmission apparatus operably connecting the actuator to the visual member whereby movement of the actuator between its first and second positions selectively moves the visual member to locate the first color member adjacent the transparent member or the second color second portion of the visual member adjacent the transparent member whereby the first color member or the second color second portion of the visual member is visible by a person located remote from the bin to provide the person with visual information concerning the level of material in the bin.

26. The indicator of claim 25 wherein:
the indicator has a pair of laterally spaced visual members,
each visual member having a cylindrical wall containing the first and second portions of the visual member, and
said first color member being on the first portion of the visual member.

27. The indicator of claim 25 wherein:
the body of the actuator is a flexible sheet member having opposite end portions adapted to extend toward the side wall of the bin.

28. The indicator of claim 25 including:
a biasing member connected to the housing and motion transmission apparatus for biasing the motion transmission apparatus to a position locating the second portion of the visual member adjacent the transparent member and the body of the actuator or spaced from the upright wall of the bin.

29. An indicator for providing visual information to a person regarding the level of material located within a bin having a side wall and a chamber for holding the material comprising:
a housing having an internal chamber,
at least one visual member movably mounted on the housing,
said visual member having a first portion and a second portion spaced from the first portion located in the internal chamber of the housing,
a first color member on the first portion of the visual member,
said second portion of the visual member having a second color,
said first color member and second color are visually contrasting colors,
a light transparent member attached to the housing enclosing the visual member within the chamber of the housing,
an actuator locatable within the chamber of the bin for movement from a first position to a second position by material in the bin and from the second position to the first position,
said actuator including a flexible body and extended downwardly into the chamber of the bin,
a bar adapted to be located within the bin and engageable with the upright wall of the bin,
a boss connected to the bar,
a fastener attached to the boss adapted to hold the boss and bar on the side wall of the bin, and
a motion transmission apparatus operably connecting the actuator to the visual member whereby movement of the actuator between its first and second positions selectively moves the visual member to locate the first color member adjacent the transparent member or the second color second portion of the visual member adjacent the transparent member whereby the first color member or the second color second portion of the visual member is visible by a person located remote from the bin to provide the person with visual information concerning the level of material in the bin,
the motion transmission apparatus includes:
a first member located adjacent the flexible body,
a second member extended into the chamber of the housing,
a spherical ball connecting the first member to the second member,
said bar including segmented spherical surfaces providing a pocket for the spherical ball allowing the first and second members to move between said first and second positions.

30. The indicator of claim 29 wherein:
the motion transmission apparatus includes:
a third member mounted on the second member,
said third member having an arcuate segment of teeth and an arcuate slot generally concentric with the arcuate segment of teeth,
a spur gear joined to the visual member engageable with the arcuate segment of teeth,
an axle mounted on the housing and extended through the slot in the third member, and
said visual member and spur gear being rotatably mounted on the axle whereby the bright color member and dark color second portion of the visual member are selectively located adjacent the transparent member and visible by a person located remote from the bin to provide the person with visual information concerning the level of material in the bin.

31. The indicator of claim 29 wherein:
the motion transmission apparatus includes:
a third member joined to the second member and movable with the second member to first and second positions in response to movement of the actuator,
a sleeve having an axial passage connected to the visual member,
an axle mounted on the housing extended through the passage of the sleeve for rotatably mounting the sleeve on the axle,
a flexible member connected to the third member,
said flexible member including a portion thereof wound around the sleeve,
said flexible member being moveable with the third member to rotate the sleeve and visual member connected to the sleeve whereby the bright color member and dark color second portion of the visual member are selectively located adjacent the transparent member and visible by a person located remote from the bin to provide the person with visual information concerning the level of material in the bin.

32. The combined material storage bin and the indicator of claim 31 wherein:
the third member includes flanges located adjacent opposite sides of the sleeve,
said flexible member being connected to the flanges, and
said portion of the flexible member wound around the sleeve being located between the flanges.

33. The indicator of claim 29 wherein:
the motion transmission apparatus includes:
a third member joined to the second member and movable with the second member to first and second positions in response to movement of the actuator,
a sleeve connected to the visual member,
at least one axle mounted on the housing rotatably mounting the visual member on the housing,
a flexible member connected to the third member,
said flexible member having a portion thereof wound around the sleeve,
said flexible member being moveable with the third member to rotate the sleeve and visual member connected to the sleeve whereby the bright color member and dark color second portion of the visual member are selectively located adjacent the transparent member are visible by a person located remote from the bin to provide the person with visual information concerning the level of material in the bin.

34. The indicator of claim 33 wherein:
the third member includes flanges located adjacent opposite sides of the sleeve, said flexible member being connected to the flanges, and said portion of the flexible member wound around the sleeve being located between the flanges.

35. An indicator for providing visual information regarding the level of material located in a bin having a side wall and a chamber for holding the material comprising:

a housing having an internal chamber, at least one visual member located within the internal chamber of the housing, said visual member having a first portion and a second portion spaced from the first portion, a first color member on the first portion of the visual member, said second portion of the visual member having a second color, said first color member and second color are visually contrasting colors, a light transparent member attached to the housing enclosing the visual member within the chamber of the housing, an actuator locatable within the chamber of the bin for movement from a first position to a second position by material in the bin and from the second position to the first position, a motion transmission apparatus operably connecting the actuator to the visual member operable to rotate the visual member in response to movement of the actuator by material in the bin, said motion transmission apparatus including, a sleeve having an axial passage connected to the visual member, an axle mounted on the housing extended through the passage of the sleeve for rotatably mounting the sleeve on the axle, a flexible member, said flexible member including a portion thereof wound around the sleeve, said flexible member being moveable to rotate the sleeve and visual member connected to the sleeve whereby the bright color member and dark color second portion of the visual member are selectively located adjacent the transparent member and visible by a person located remote from the bin to provide the person with visual information concerning the level of material in the bin.

36. The indicator of claim 35 wherein:

the motion transmission apparatus includes flanges located adjacent opposite sides of the sleeve, said flexible member being connected to the flanges, and said portion of the flexible member wound around the sleeve being located between the flanges.

* * * * *